(12) United States Patent
Kim

(10) Patent No.: US 12,158,033 B2
(45) Date of Patent: Dec. 3, 2024

(54) CHARGING FLAP OPENING/CLOSING DEVICE AND VEHICLE INCLUDING THE SAME

(71) Applicants: HYUNDAI MOTOR COMPANY, Seoul (KR); KIA CORPORATION, Seoul (KR)

(72) Inventor: Tae-Hyung Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 245 days.

(21) Appl. No.: 17/841,921

(22) Filed: Jun. 16, 2022

(65) Prior Publication Data

US 2023/0076933 A1  Mar. 9, 2023

(30) Foreign Application Priority Data

Sep. 3, 2021 (KR) .................. 10-2021-0117451

(51) Int. Cl.
*E05F 1/10* (2006.01)
*B60K 15/05* (2006.01)

(52) U.S. Cl.
CPC .............. *E05F 1/10* (2013.01); *B60K 15/05* (2013.01); *B60K 2015/0515* (2013.01)

(58) Field of Classification Search
CPC .................................. E05F 1/10; B60L 5/05
USPC ........................................................ 296/97.22
See application file for complete search history.

(56) References Cited

U.S. PATENT DOCUMENTS

2017/0292305 A1  10/2017  Geissenhoener et al.

FOREIGN PATENT DOCUMENTS

| CN | 112590945 A | * | 4/2021 | .............. B60L 53/16 |
| WO | WO-2013137029 A1 | * | 9/2013 | .............. B60L 53/16 |

OTHER PUBLICATIONS

CN-112590945-A (Ji et al.) (Apr. 2, 2021) (Machine Translation) (Year: 2021).*

* cited by examiner

*Primary Examiner* — Mahmoud Gimie
(74) *Attorney, Agent, or Firm* — Lempia Summerfield Katz LLC

(57) ABSTRACT

Provided are a seamless charging flap opening/closing device and a vehicle including the same. A charging flap cover is additionally provided with a pop-up function to also function as an opening/closing door for an air channel of an air breather, such that the charging flap cover is integrated with the air breather to be unperceivable from the outside during driving and is only opened during charging to allow a battery to be charged. The single charging flap cover is used in common by a charging flap device and the air breather maintaining independent functions. The exterior quality of a product and the efficiency of use of a package is improved, a vehicle body has a distinctive novel exterior image, and the charging flap cover is easily matched adjacently to a moving part located adjacent thereto.

19 Claims, 13 Drawing Sheets

[CHARGING STATE]

[INTERNAL PERSPECTIVE VIEW OF D]

FIG.12
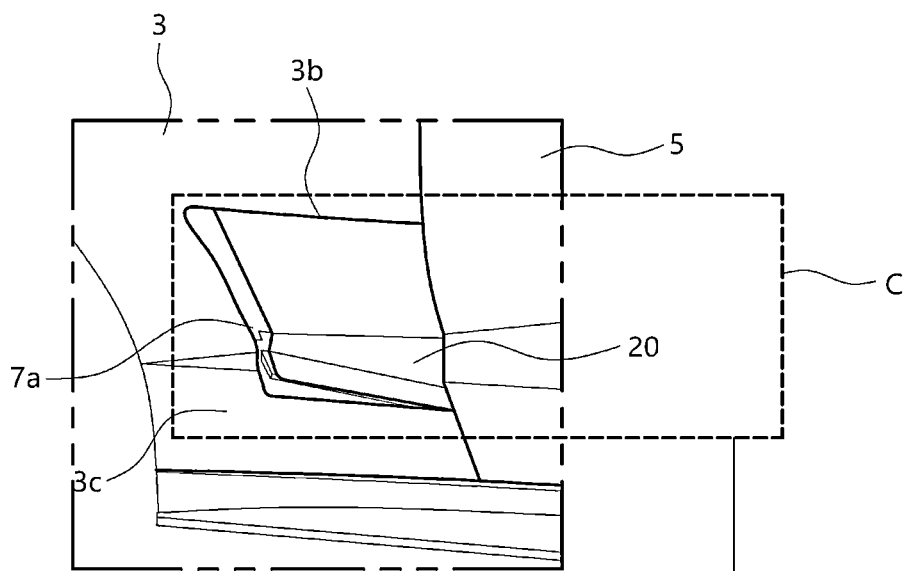
[DRIVING STATE]
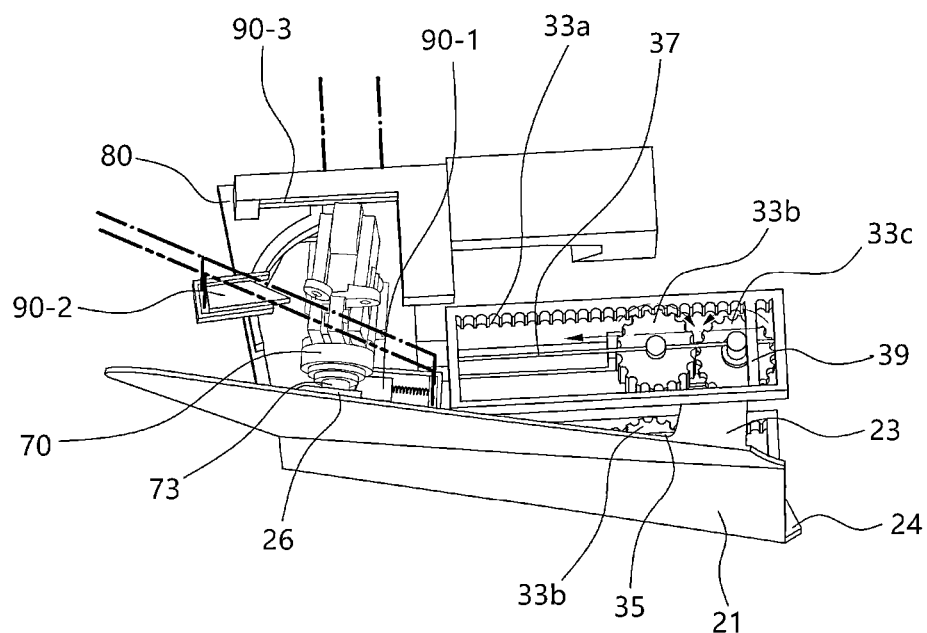
[INTERNAL PERSPECTIVE VIEW OF C]

CHARGING FLAP OPENING/CLOSING DEVICE AND VEHICLE INCLUDING THE SAME

CROSS-REFERENCE TO RELATED APPLICATION

This application claims priority to and the benefit of Korean Patent Application No. 10-2021-0117451, filed on Sep. 3, 2021, the entire contents of which are incorporated herein by reference.

BACKGROUND

Field

The present disclosure relates to a charging flap opening/closing device and, more particularly, to a vehicle including a seamless charging flap opening/closing device.

Description of Related Art

The statements in this section merely provide background information related to the present disclosure and may not constitute prior art.

Generally, among vehicles, electric vehicles that have recently been commercialized are provided with a charging door device.

For example, the charging door device includes a door cover having an opening/closing structure and matched to the exterior of a vehicle body and a charging body (or a charging bracket) having a charging inlet into which an external charging plug is fitted and connected to a battery through a power cable.

Thus, the charging door device remains matched to the exterior of the vehicle body by closing the door cover when the battery is not charged. In contrast, when the battery is to be charged, the door cover is opened to expose the charging inlet of the charging body to the outside, thereby allowing the battery to be charged.

However, since electric vehicles among various types of vehicles reflect the preference of consumers requiring a refined and beautiful exterior design, even though the charging door device including the door cover having the opening/closing structure is matched to the external of the vehicle body, the exterior line of the door cover may be perceived from the outside. This is inevitably a reason for degrading a refined and beautiful exterior design aspect required for vehicles, in particular, electric vehicles.

In addition, such a degradation in the exterior design is increased by an aerodynamic improvement device for reducing vehicle drag. For example, an air breather, i.e., a type of aerodynamic improvement device, has an air channel provided on a vehicle side portion (e.g., a fender or a wheel house) to form a flow or air. An outlet portion of the air channel is constantly perceivable from the outside of the vehicle body, thereby further degrading the exterior design.

Furthermore, the charging door device and the air breather are present separately and independently, thereby causing several difficulties in the exterior design aspect.

First, since the charging door device and the air breather are present separately, the exterior quality of a product and the efficiency of use of a package may be degraded. Second, due to the door cover, it is difficult to provide a distinctive novel exterior image. Third, it is difficult to match the charging door device adjacently to a vehicle door, i.e., a moving part.

SUMMARY

The present disclosure provides a charging flap opening/closing device and a vehicle including the same. In particular, a charging flap cover is additionally provided with a pop-up function to also function as an opening/closing charging flap for an air channel of an air breather, such that the charging flap cover is integrated with the air breather to be unperceivable from the outside during driving and is only opened during charging to allow a battery to be charged. In particular, the single charging flap cover is used in common by a charging flap device and the air breather maintaining independent functions. Thus, the exterior quality of a product and the efficiency of use of a package can be improved, a vehicle body can have a distinctive novel exterior image, and the charging flap cover can be easily matched adjacently to a moving part located adjacent thereto.

According to one embodiment of the present disclosure, a charging flap opening/closing device includes: a hidden charging flap configured to be opened and closed, with a support portion being provided on one side and a movable portion being provided on an opposite side to the support portion; a charging flap cover operating unit located in an inner space defined by the hidden charging flap and configured to operate the hidden charging flap so that the movable portion is pushed forward, pulled backward or popped up; and a charging unit located in the inner space of the hidden charging flap and configured to be exposed to outside by the opening/closing of the hidden charging flap so that an external charger is fitted to the charging unit.

In another embodiment, the hidden charging flap may include: a charging flap cover including a cover body configured to form the support portion and the movable portion, wherein a top end is formed in a top portion of the support portion and a bottom end is formed in a bottom portion of the support portion; a top end cover motion guide connected to the top end, and configured to rotate or linearly move to cause the movable portion to be pushed forward, pulled backward, or popped up; and a bottom end cover motion guide connected to the bottom end, and configured to move in concert with movement of the top end cover motion guide.

As an exemplary embodiment, the top end and the bottom end may be perpendicularly bent with respect to the cover body, and the perpendicular bending may provide a rotation line from the top end and the bottom end.

As an exemplary embodiment, each of the top end cover motion guide and the bottom end cover motion guide may include a gear, and the gear may realize the rotation and the linear movement.

As an exemplary embodiment, the gear of the top end cover motion guide may include: a linear gear provided on a rack housing to be provided on an inner surface of a housing space in which the gear is located; a reverse gear engaged with the linear gear, and including a gear shaft fixed to left and right sidewalls of the rack housing, with a guide rod extending across the housing space extending through the gear shaft of the reverse gear; and a forward gear engaged with the linear gear and the reverse gear, and including a gear shaft fixed to the top end, with the guide rod extending through the gear shaft of the forward gear.

As an exemplary embodiment, a power switch may be provided on a sidewall of the rack housing. The power switch may convert a contact off signal into a contact on signal through contact with the gear shaft of the forward gear.

As an exemplary embodiment, the gear of the bottom end cover motion guide may include: a linear gear provided on a rack housing to be provided on an inner surface of a housing space in which the gear is located; a reverse gear engaged with the linear gear, and including a gear shaft fixed to left and right sidewalls of the rack housing, with a guide rod extending across the housing space extending through the gear shaft of the reverse gear; and a forward gear engaged with the linear gear and the reverse gear, and including a gear shaft fixed to the bottom end, with the guide rod extending through the gear shaft of the forward gear.

As an exemplary embodiment, the charging flap cover operating unit may include: a cover opener connected and separated from a charging flap cover of the hidden charging flap, and configured to realize a forward-pushing motion, a backward-pulling motion, and a popping-up motion of the movable portion; an opener positioner configured to generate electromagnetic force by separately controlling current to a first electromagnet and a second electromagnet and to fix a moved position of the cover opener while moving the cover opener forward and backward using the electromagnetic force; and a mounting frame on which a charging unit, as well as the cover opener and the opener positioner, is mounted.

As an exemplary embodiment, the cover opener may be driven by an actuator. A hook configured to be fastened to a holder of the charging flap cover may be provided on a front portion of the actuator. A permanent magnet facing the first electromagnet and the second electromagnet may be provided on a rear portion of the actuator.

As an exemplary embodiment, the cover opener may be a hydraulic cylinder.

As an exemplary embodiment, the opener positioner may include: an electromagnet wire through which current flows; an opener movement positioner including the first electromagnet and the second electromagnet, and configured to generate repulsion using the first electromagnet to enable the forward movement and generate attraction using the second electromagnet to enable the backward movement; an opener front positioner including the second electromagnet, and configured to draw a front clasp by the attraction of the second electromagnet so as to release a front portion of the cover opener from a restrained state; and an opener rear positioner including the second electromagnet, and configured to draw a rear clasp by the attraction of the second electromagnet so as to release a rear portion of the cover opener from a restrained state.

As an exemplary embodiment, each of the front clasp and the rear clasp may include a steel plate as a portion facing the second electromagnet, and may be elastically supported by an elastic member.

As an exemplary embodiment, the opener positioner may include a charging flap cover switch, the charging flap cover switch being provided on the mounting frame, and being configured to convert a contact off signal into a contact on signal by contact with the cover opener in a position in front of the cover opener.

As an exemplary embodiment, the mounting frame may be divided into a port frame on which the charging unit is located, an opener frame on which the cover opener is located at a side of the port frame, and a transverse frame on which the opener positioner being is located behind the opener frame.

As an exemplary embodiment, the opener frame may include a rear receptacle and a front receptacle. The opener rear positioner may be located in the rear receptacle. The opener front positioner may be located in the front receptacle.

As an exemplary embodiment, the opener frame may include an opener guide sidewall provided at a boundary between the opener frame and the port frame and connected to the transverse frame. The opener guide sidewall may define an opener rotation angle at which a hook of the cover opener is detached from a holder of the charging flap cover.

According to the present disclosure for achieving the objective, a vehicle may include: an air breather provided on a fender side cover of a fender, and configured to direct driving wind from the wheel guide toward a vehicle door; a charging flap opening/closing device including a cover opener connected to a charging flap cover concealing a charging inlet of the fender at an outlet side of the air breather, wherein the charging flap cover is converted to one state among forward pushing in which the outlet of the air breather is concealed by pushing the cover opener by repulsion of a first electromagnet and drawing the cover opener by attraction of a second electromagnet while restraining a front portion of the cover opener by a front clasp and restraining a rear portion of the cover opener by a rear clasp in a forward movement state of the cover opener, backward pushing in which an outlet of the air breather is opened, and popping up in which a charging unit to which an external charger is fitted is exposed to outside; and a controller controlling flows of current through electromagnet wires connected to the first electromagnet and the second electromagnet.

As an exemplary embodiment, an outwardly-exposed surface of the charging flap cover may have the same surface texture as an outwardly-exposed surface of the fender.

As an exemplary embodiment, the air breather may be converted into a hidden air breather unperceivable from outside in a vehicle stopped state and serves as an outwardly exposed air breather in a vehicle driving state. The outwardly exposed air breather may be converted into the hidden air breather when the vehicle driving state is converted into the vehicle stopped state.

As an exemplary embodiment, the air breather may serve as the outwardly exposed air breather by providing a channel through which air remaining inside the wheel house is discharged in the vehicle driving state.

The charging flap opening/closing device applied to the vehicle according to the present disclosure implements the following operations and effects.

First, since the charging flap opening/closing device is perceivable from the outside only during charging, a refined and beautiful exterior design can be realized in a vehicle, in particular, an electric vehicle. Second, since limitations against a package including the charging flap opening/closing device and the air breather are overcome, an exterior image of a charging inlet can be improved and aerodynamics can be improved. Third, complexity in a vehicle, in particular, an electric vehicle can be overcome and the charging flap opening/closing device can have a distinctive position and function. Thus, the vehicle body can have a distinctive exterior image to improve the exterior quality of a product compared to other types of vehicles. Fourth, by the use of the charging flap cover of the charging flap opening/closing device, a variety of different images can be perceived from the outside. Fifth, since the charging flap cover of the charging flap opening/closing device can be opened by a forward movement, matching the charging flap cover adjacently to a moving part, such as a vehicle door, located adjacent thereto can be easily controlled.

BRIEF DESCRIPTION OF THE DRAWINGS

In order that the disclosure may be well understood, there will now be described various forms thereof, given by way of example, reference being made to the accompanying drawings, in which:

FIG. 12 illustrates an operation state of the seamless charging flap opening/closing device according to one embodiment of the present disclosure in the driving state of the vehicle.

The drawings described herein are for illustration purposes only and are not intended to limit the scope of the present disclosure in any way.

DETAILED DESCRIPTION

Hereinafter, some embodiments of the present disclosure are described in detail with reference to accompanying exemplary drawings. The embodiments are illustrative and may be implemented in various different forms by those of having ordinary skill in the art to which the present disclosure pertains, and thus, the present disclosure is not limited to the exemplary embodiment described herein.

When a component, device, element, or the like of the present disclosure is described as having a purpose or performing an operation, function, or the like, the component, device, or element should be considered herein as being "configured to" meet that purpose or to perform that operation or function.

Figure 1:
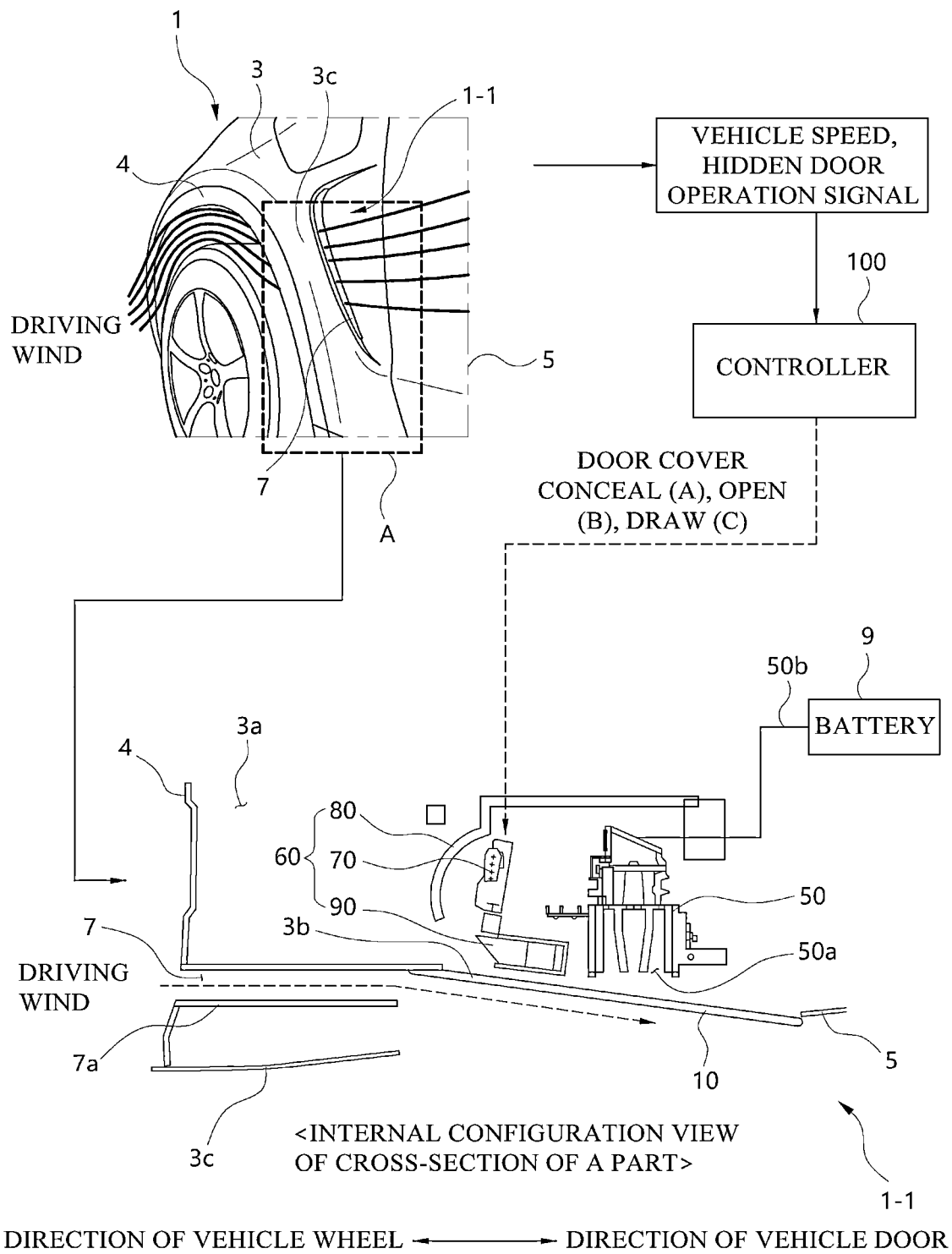
FIG. 1 illustrates a vehicle to which a seamless charging flap opening/closing device according to one embodiment of the present disclosure is applied.

Referring to FIG. 1, a vehicle 1 includes a seamless charging flap opening/closing device 1-1 and an air breather 7. Although the vehicle 1 is illustrated as being an electric vehicle in this case, the vehicle 1 may be any type of vehicle to which a charging flap of a charging device for charging a battery, i.e., a seamless charging flap opening/closing device, is applied.

For example, the air breather 7 is provided as an air breather duct 7a arranged along a fender side cover 3c forming a side portion of a fender 3. Thus, the air breather 7 is covered with the fender side cover 3c so as to not be exposed to the outside. In this case, the air breather duct 7a has a hole space in the wheel guard 4 as a driving wind inlet and an open space of the fender side cover 3c as a drive wind outlet. The air breather 7 directs the driving wind exiting the outlet from the inlet to flow from the vehicle door 5 along the side surface of the vehicle. In this manner, the air breather 7 serves as an aerodynamic improvement device to improve the aerodynamics of the vehicle.

In another embodiment, the charging flap opening/closing device 1-1 includes a hidden charging flap 10, a charging unit 50, a door cover operating unit 60, and a controller 100.

For example, the hidden charging flap 10 is located on a fender side end portion of the fender 3. In this state, the hidden charging flap 10 conceals the charging hole 3b formed in the fender side end portion using the charging flap cover 20 having the same surface texture as the fender side end portion (see FIG. 2). In this case, the fender side end portion is a section extending toward the vehicle door 5 with a step from the fender side cover 3c. The fender side end portion is a rear side section portion of the fender 3 divided from the fender side cover 3c, i.e., the front side section portion.

For example, the charging unit 50 is located in a fender inner space 3a of the fender 3. The charging unit 50 is concealed with the hidden charging flap 10 so as not to be exposed to the outside. In this state, when the hidden charging flap 10 (i.e., the door cover 20 (see FIG. 2)) is opened by being pushed away and outward (or linear moved and rotated) from the fender 3 by the charging flap cover operating unit 60 operating in response to the charging flap cover open signal (b) of the controller 100, the charging unit 50 is exposed to the outside.

In this regard, the charging unit 50 includes a charging inlet 50a into which an external charger (not shown) is fitted and a power cable 50b extending from the charging unit 50 to a vehicle battery 9 to charge the vehicle battery 9 with external power.

For example, the charging flap cover operating unit 60 is provided on a side of the charging unit 50 located in the fender inner space 3a. In a state in which the charging flap cover operating unit 60 is covered with the hidden charging flap 10 so as not to be exposed to the outside, the charging flap cover operating unit 60 operates in response to each of a charging flap cover conceal signal (a), a charging flap cover open signal (b), and a charging flap cover draw signal (c) of the controller 100, thereby allowing the hidden charging flap 10 (i.e., the charging flap cover 20 (see FIG. 2)) to operate in accordance with one of driving, stopped, and charging states of the vehicle 1.

In this regard, the charging flap cover operating unit 60 includes a cover opener 70, a mounting frame 80, and an opener positioner 90.

Figure 5:
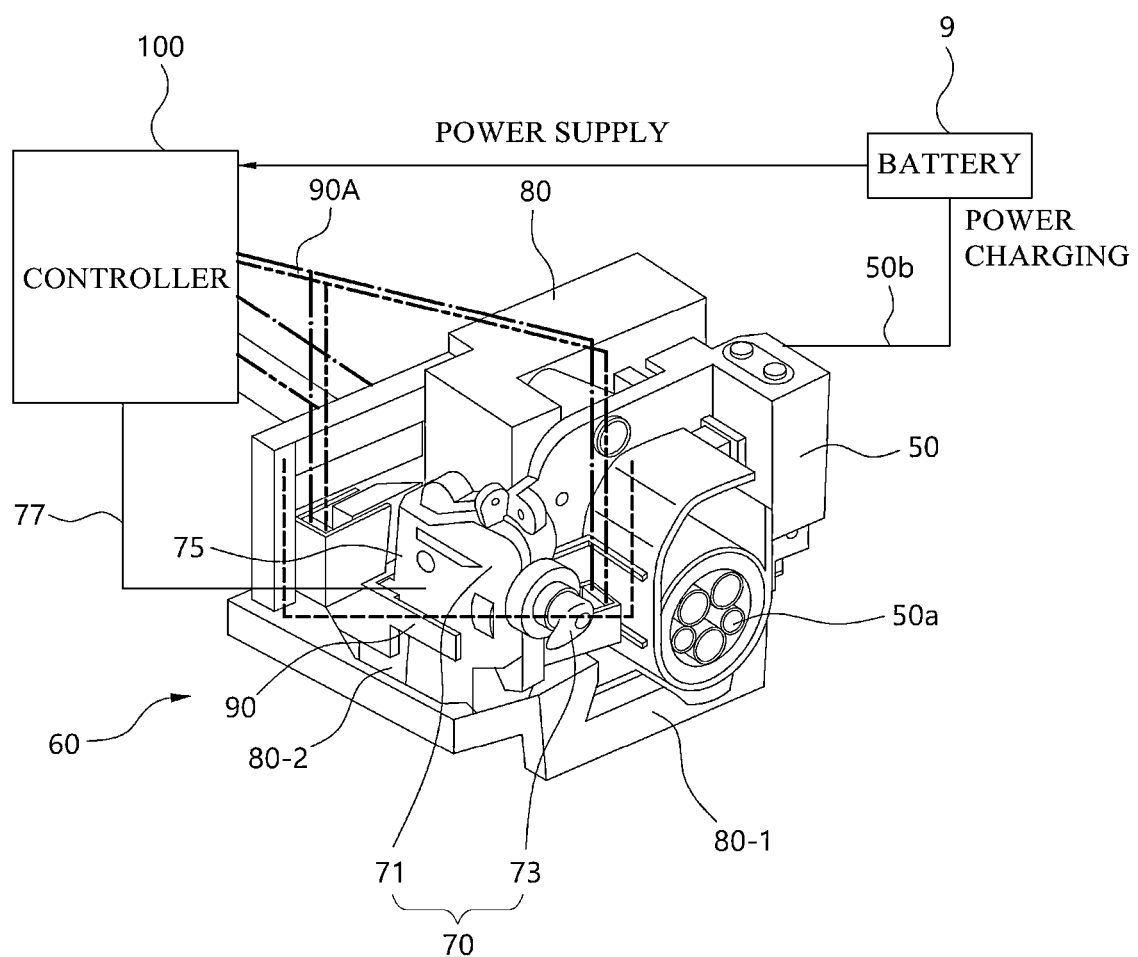
FIG. 5 is a front perspective view illustrating the charging flap cover operating unit according to one embodiment of the present disclosure.

In particular, the cover opener 70 is located on a side of the charging unit 50 and operates by receiving power through opener electrical wires 77 (see FIG. 5). The mounting frame 80 provides a layout of electromagnets 91 and 92 while arranging the charging unit 50 and the cover opener 70 in a transverse direction. The opener positioner 90 generates push force of moving the cover opener 70 backward (i.e., in the direction inside the fender), full force of moving the cover opener 70 forward (i.e., in the direction outside the fender), and binding force or fixing force of restraining the forward/backward movement of the cover opener 70 as electromagnetic force. In this case, the electromagnetic force is generated by supplying power by the controller 100.

For example, the controller 100 is an electronic control unit (ECU) including a memory having stored therein a logic for control over supply of power to and stopping of supply of power to the cover opener 70 and opener positioner 90 as well as the charging flap cover conceal signal (a), the charging flap cover open signal (b), and the charging flap cover draw signal (c). The controller 100 operates as a central processing unit (CPU) for performing an external logic to output the charging flap cover conceal signal (a), the charging flap cover open signal (b), and the charging flap cover draw signal (c) while receiving a vehicle speed signal and a hidden charging flap operation signal as input data from the vehicle 1.

In particular, the controller 100 may not generate the charging flap cover open signal (b) among the charging flap cover conceal signal (a), the charging flap cover open signal (b), and the charging flap cover draw signal (c). This is because, when a hook 73 (see FIG. 4) of the cover opener 70 is configured to be retracted into an actuator 71 when pushed externally and to be protruded from the actuator 71 when the external pushing is removed, it is possible to retract the hook 73 into the actuator 71 and protrude the hook 73 from the actuator 71 by performing an operation of pushing the charging flap cover 20 of the hidden charging flap 10 for the charging as the external pushing, thereby enabling the charging flap cover 20 to realize a pop-up operation.

Although the cover opener 70 may not be driven in response to the charging flap cover open signal b of the controller 100, the cover opener 70 is described hereinafter as being driven in response to the charging flap cover open signal b.

Thus, the charging flap opening/closing device 1-1 provides the function of the charging flap cover 20 of the charging unit 50 using the hidden charging flap 10 while providing the function of an air breather guide to introduce driving wind of the air breather 7. The charging unit 50 is only opened during the charging of the vehicle 1 so that the charging unit 50 is not perceivable from the outside when the vehicle is stopped. In one form, the charging flap opening/closing device 1-1 may be a seamless charging flap opening/closing device.

Figure 4:
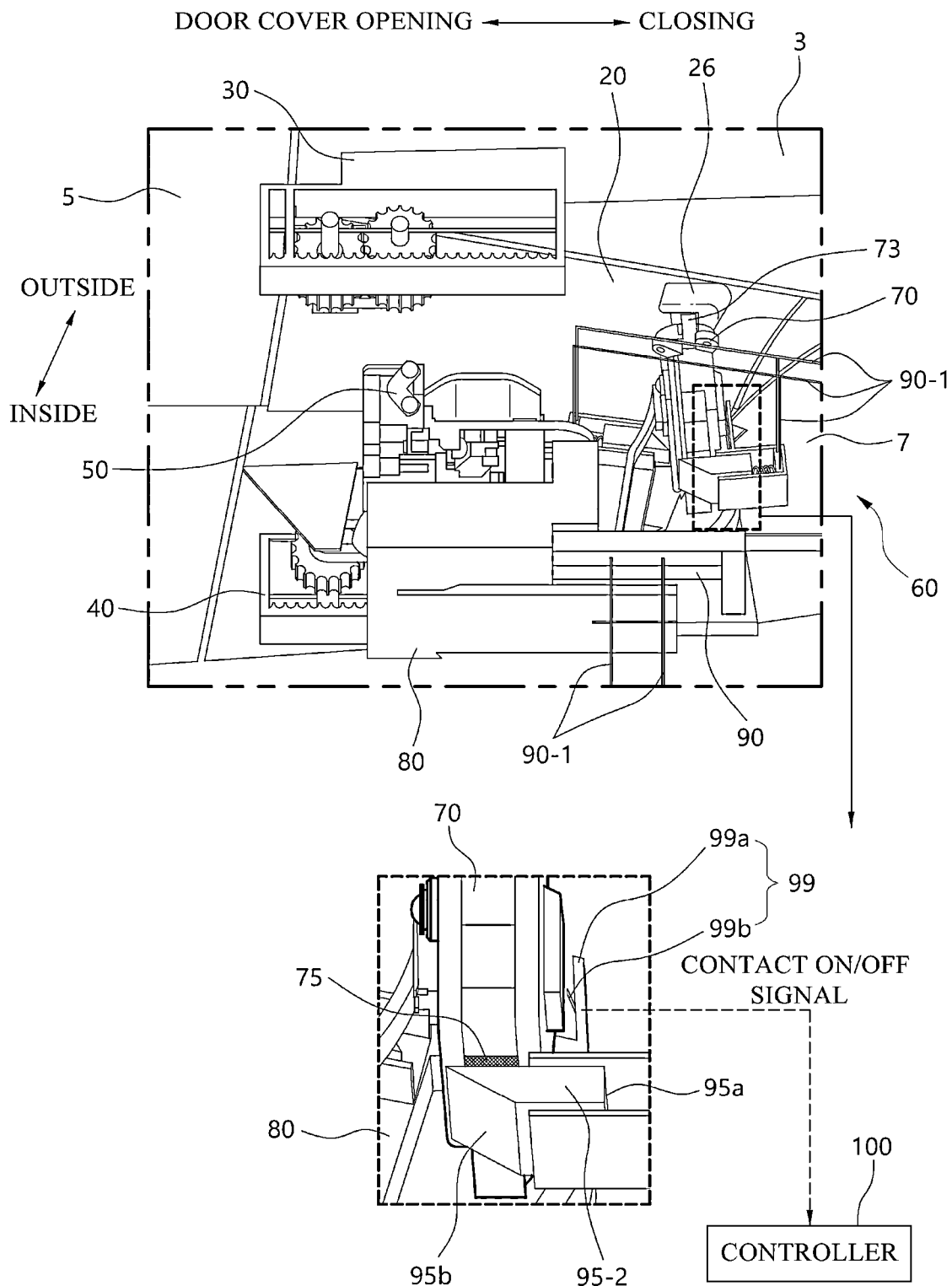
FIG. 4 is a rear perspective view illustrating the charging flap cover operating unit and charging unit of the seamless charging flap opening/closing device according to one embodiment of the present disclosure, in which the charging flap cover operating unit and charging unit are integrally fitted to each other and located in the fender inner space.

In particular, the seamless charging flap opening/closing device 1-1 also has the characteristics of the electric seamless charging flap opening/closing device 1-1 that drives the cover opener 70 of the door cover operating unit 60 using the actuator 71 (see FIG. 4).

In addition, FIGS. 2 to 6 illustrate specific configurations of the hidden charging flap 10 and the charging flap cover operating unit 60 of the charging flap opening/closing device 1-1.

Figure 2:
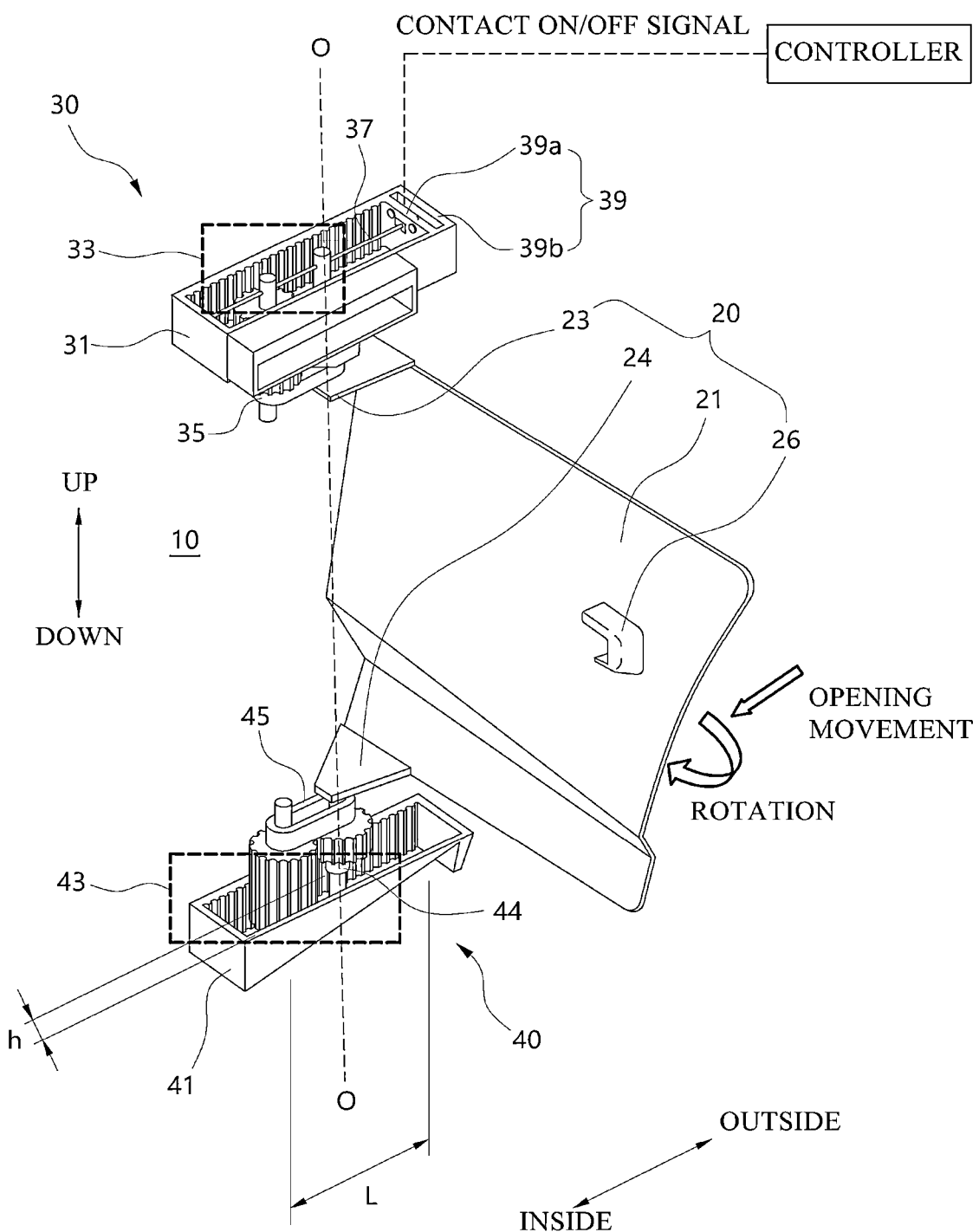
FIG. 2 illustrates an open state of components of the hidden charging flap of the seamless charging flap opening/closing device according to one embodiment of the present disclosure.
Figure 3:
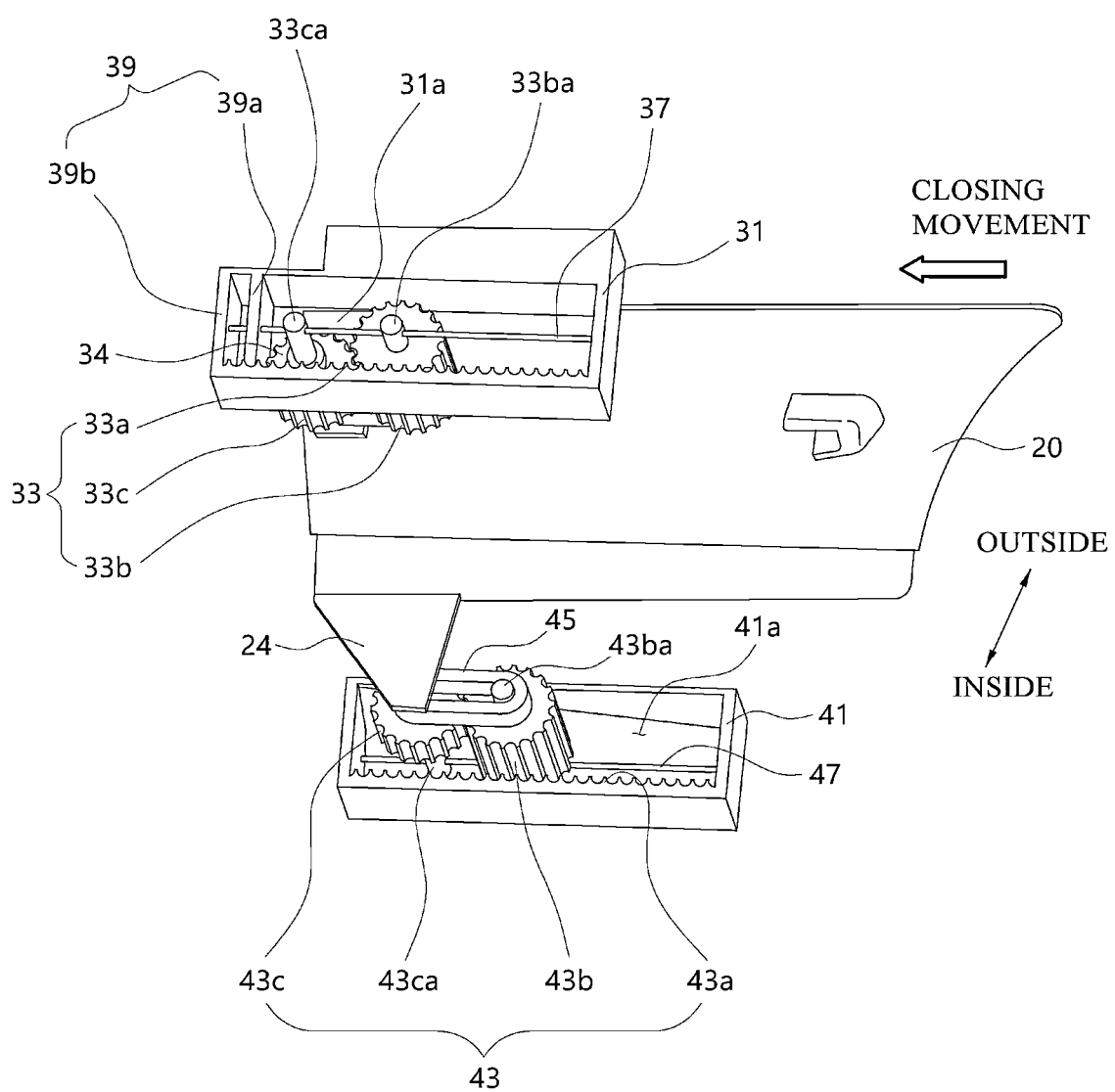
FIG. 3 illustrates a concealed state of the components of the hidden charging flap of the seamless charging flap opening/closing device according to one embodiment of the present disclosure.

Referring to the hidden charging flap 10 illustrated in FIGS. 2 and 3, the hidden charging flap 10 includes the charging flap cover 20, a top end cover motion guide 30, and a bottom end cover motion guide 40.

In one embodiment, the charging flap cover 20 includes: a cover body 21 to which the design shape of the fender 3 or the fender side end portion is applied such that the cover body 21 is viewed externally as a portion of the fender 3; a top end 23 provided as one end of the top portion (i.e., the upper portion) of the cover body 21 so as to be connected to the top end cover motion guide 30; a bottom end 24 provided as one end of the bottom portion (i.e., the lower portion) of the cover body 21 so as to be connected to the bottom end cover motion guide 40; and a holder 26 protruding from one side surface (e.g., the opposite side of the surface opened to the outside) of the cover body 21.

For example, the size and shape of the cover body 21 match the size and shape of the charging hole 3b such that the cover body 21 covers the charging hole 3b formed in the fender side end portion of the fender 3. The top end 23 and the bottom end 24 respectively have a bent structure bent perpendicularly to the cover body 21 while being directed to face each other. The holder 26 has a recess structure such that the hook 73 (see FIGS. 10 and 12) of the cover opener 70 is fastened thereto, and is located on the cover body 21 opposite to the top and bottom ends 23 and 24. In this case, the recess structure of the holder 26 is provided as a slit such that the hook-shaped front end of the hook 73 may escape and be separated from the holder 26 when the door cover 20 (i.e., the cover body 21) rotates.

In another embodiment, the top end cover motion guide 30 includes a rack housing 31, a gear 33, a bearing 34, a clamp 35, a guide rod 37, and a power switch 39 as components thereof, while the bottom end cover motion guide 40 includes a rack housing 41, a gear 43, a bearing 44, a clamp 45, and a guide rod 47 as components thereof.

Thus, the top and bottom end cover motion guides 30 and 40 are connected to the cover body 21 through the top and bottom ends 23 and 24, and guide the movement of the cover body 21 such that the cover body 21 is rotatable and linearly movable due to the movement of the cover opener 70 through the holder 26 connected to the hook 73 (see FIGS. 10 and 12), so that the door cover 20 may be converted to a concealing state, a drawing state, and an opening state.

In particular, the rack housings 31 and 41, the gears 33 and 43, the bearings 33 and 44, the clamps 35 and 45, and the guide rods 37 and 47 are divided into the top end rack housing 31, the top end gear 33, the top end bearing 34, the top end clamp 35, and the top end guide rod 37 applied to the top end cover motion guide 30 and into the bottom end rack housing 41, the bottom end gear 43, the bottom end bearing 44, the bottom end clamp 45, and the bottom end guide rod 47 applied to the bottom end cover motion guide 40. Here, the power switch 39 is only applied to the top end cover motion guide 30 without being applied to the bottom end cover motion guide 40.

However, the rack housings 31 and 41, the gears 33 and 43, the bearings 34 and 44, the clamps 35 and 45, and the guide rods 37 and 47 are components common to both the top end cover motion guide 30 and the bottom end cover motion guide 40, and thus these components are described together for simplicity and clarity of explanation.

For example, the rack housings 31 and 41 are provided as rectangular frames with housing spaces 31a and 41a being opened in the top and bottom directions, and the gears 33 and 43 and the guide rods 37 and 47 are disposed inside the housing spaces 31a and 41a. In this case, the rack housings 31 and 41 are fixed to surface portions of the fender side end portion, in the fender inner space 3a of the fender 3, by welding or other attaching means.

In particular, the rack housings 31 and 41 determine a range in which the charging flap cover 20 (i.e., the cover body 21) is linearly movable by a charging flap cover movement length L (see FIG. 2). The charging flap cover movement length L is set according to a distance to which the charging flap cover 20 is linearly movable.

For example, the gear 33 includes: a linear gear 33a provided on the inner surface of a left transverse sidewall frame of left and right transverse sidewall frames of the rack housing 31; a reverse gear 33b engaged with the linear gear 33a; and a forward gear 33c engaged with the linear gear 33a and the reverse gear 33b while being connected to the top end 23 of the charging flap cover 20. In addition, the gear 43 includes: a linear gear 43a provided on the inner surface of the left transverse sidewall frame of left and right transverse sidewall frames of the rack housing 41; a reverse gear 43b engaged with the linear gear 43a; and a forward gear 43c engaged with the linear gear 43a and the reverse gear 43b while being connected to the bottom end 24 of the charging flap cover 20.

In particular, the forward gears 33c and 43c form a predetermined power switch gap "h" (see FIG. 2) in a length shorter than the length of the reverse gears 33b and 43b, thereby allowing a gear shaft 33ca to be in contact with the power switch 39 at a point at which a half portion of the forward gear 33c has passed by the power switch 39.

Thus, the reverse gears 33b and 43b and the forward gears 33c and 43c rotate in opposite directions while engaged with the linear gears 33a and 43a. The forward gears 33c and 43c rotate in engagement with the linear gears 33a and 43a while being pushed in the linear movement direction of the hidden charging flap 10 (i.e., charging flap cover 20).

In particular, the linear gear 33a may be formed on both left and right transverse sidewall frames of the rack housing 31, while the linear gear 43a may be formed on both left and right transverse sidewall frames of the rack housing 41. Since the linear gears 33a and 43a are formed as racks along the length of the transverse sidewall frames, pinions are applied to the reverse gears 33b and 43b and the forward gears 33c and 43c.

For example, the bearings 34 and 44, the clamps 35 and 45, and the guide rods 37 and 47 are selectively applied to gear shafts 33ba and 43ba of the reverse gears 33b and 43b and gear shafts 33ca and 43ca of the forward gears 33c and 43c. In this case, the gear shafts 33ca and 43ca of the forward gears 33c and 43c define a rotation line O-O (see FIG. 2) for the cover body 21 of the charging flap cover 20.

In particular, each of the gear shafts 33ba and 43ba of the reverse gears 33b and 43b is configured such that both end portions thereof are provided as free ends. In contrast, each of the gear shafts 33ca and 43ca of the forward gears 33c and 43c is configured such that one end portion thereof is provided as a free end and the other end portion thereof is provided as a fixed end. Thus, the gear shafts 33ca and 43ca are characterized as gear shafts integrated with the hidden charging flap (or gear shafts integrated with the charging flap cover). In this case, the fixed end of the gear shaft 33ca applied to the forward gear 33c is fixed to the top end 23, and the fixed end of the gear shaft 43ca applied to the forward gear 43c is fixed to the bottom end 24.

Thus, the bearing 34 is coupled to the forward gear 33c at a portion of the free end (see FIG. 3) of the gear shaft 33ca applied to the forward gear 33c, while the bearing 44 is coupled to the forward gear 43c at a portion of the free end of the gear shaft 43ca applied to the forward gear 43c (see FIG. 2). In this case, the bearings 34 and 44 facilitate the rotation of the forward gears 33c and 43c.

In addition, the clamps 35 and 45 are provided as a closed belt structure configured to bind the fixed ends of the gear shafts 33ca and 43ca applied to the forward gears 33c and 43c and the free ends of the gear shafts 33ba and 43ba applied to the reverse gears 33b and 43b, thereby enabling the forward gears 33c and 43c and the reverse gears 33b and 43b to maintain the mutually engaged state.

In addition, the guide rods 37 and 47 extend through the free ends of the gear shafts 33ba, 43ba, 33ca, and 43ca applied to the forward and reverse gears 33c, 43c, 33b, and 43b, respectively. The left and right ends of the guide rods 37 and 47 are fixed to front and rear vertical sidewall frames of the rack housings 31 and 41. Thus, the guide rods 37 and 47 extend across the housing spaces 31a and 41a of the rack housings 31 and 41. In this states, the guide rods 37 and 47 stabilize forward and backward linear movement of the forward and reverse gears 33c, 43c, 33b, and 43b.

For example, the power switch 39 is located on the housing spaces 31a and 41a and is disposed on a side of the rear vertical sidewall frame among the front and rear vertical sidewall frames of the rack housings 31 and 41. Thus, in linear movement of the charging flap cover 20, the power switch 39 is in contact with the gear shaft 33ca of the forward gear 33c fixed to the top end 23.

In this regard, the power switch 39 includes a contact terminal 39a configured to be pushed by the gear shaft 33ca provided on the forward gear 33c of the top end cover motion guide 30 and a circuit board 39b located vertically in the housing space 31a to generate a contact point connection signal and a contact point short-circuit signal of the contact terminal 39a. In this case, the circuit board 39b is implemented as a printed circuit board (PCB).

In addition, the power switch 39 is configured to connect signal lines to the circuit board 39b, and the signal lines are configured to transmit the contact point connection signal and the contact point short-circuit signal of the contact terminal 39a to the controller 100 as contact on/off signals (see FIG. 2).

Figure 6:
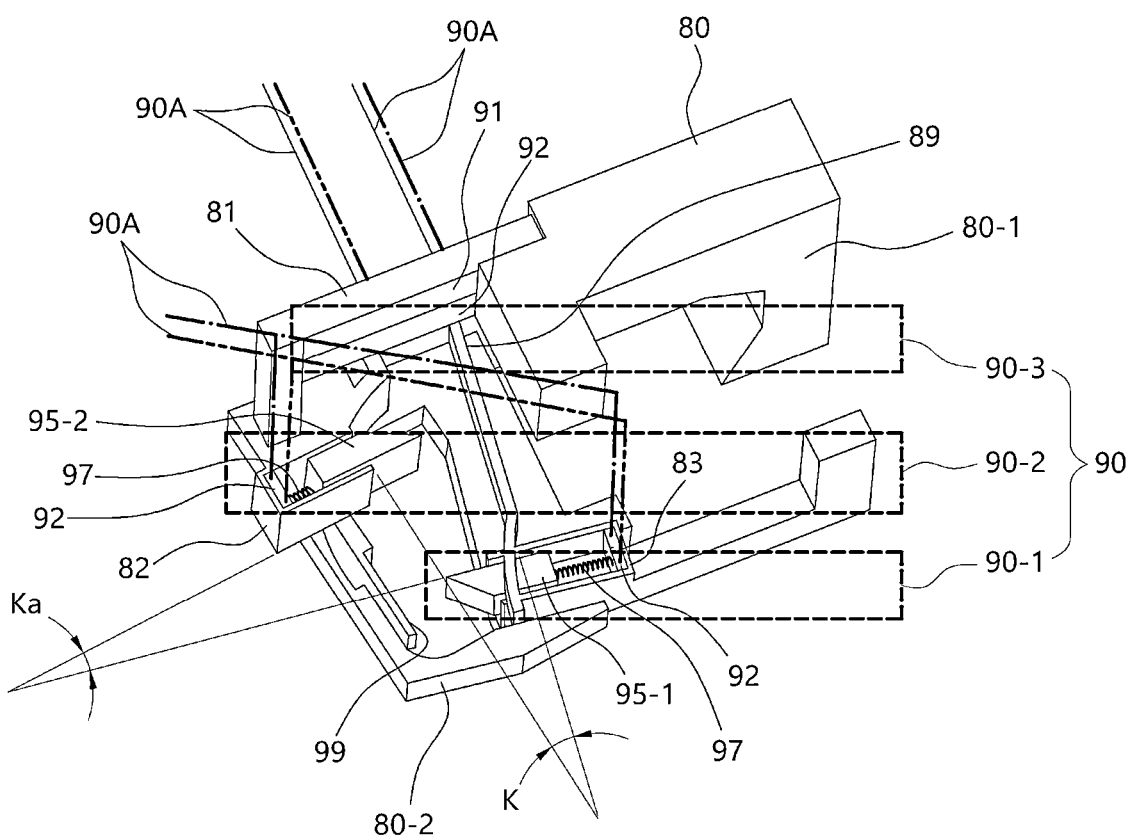
FIG. 6 is a view illustrating the configuration of the mounting frame and the electromagnet of the charging flap cover operating unit according to one embodiment of the present disclosure.

Referring to the charging flap cover operating unit 60 illustrated in FIGS. 4 to 6, the charging flap cover operating unit 60 locates the charging unit 50 at a side of the cover opener 70 while integrating the cover opener 70 and the opener positioner 90 using the mounting frame 80.

In one embodiment, the cover opener 70 includes the actuator 71 configured to be driven under the control of the controller 100, the hook 73 configured to be automatically retracted into or protruded from the front portion of the actuator 71 due to the operation of the actuator 71, a permanent magnet 75 provided behind the actuator 71, and the opener electrical wires 77 through which power is supplied to the actuator 71 driven under the control of the controller 100.

In particular, the hook 73 having the hook-shaped front end is configured to be fastened and coupled to the recess structure of the holder 26 (see FIGS. 10 and 12) and, when the charging flap cover 20 (i.e., the cover body 21) rotates, escape from the recess of the holder 26.

In one form, the mounting frame 80 divides the horizontal frame into a port frame 80-1 and an opener frame 80-2 by dividing left and right sections of the horizontal frame using a vertical partition, couples the charging unit 50 to the space of the port frame 80-1, and couples the cover opener 70 and the opener positioner 90 to the space of the opener frame 80-2.

For example, the opener frame 80-2 includes a transverse frame 81 provided as a sidewall blocking the rear side of the opener frame 80-2, a rear receptacle 82 spaced apart from the transverse frame 81 and located at a side of the opener frame 80-2, and a front receptacle 83 provided at the front side of the opener frame 80-2 to be located opposite to the rear receptacle 82. In this case, each of the rear receptacle 82 and the front receptacle 83 has a C-shaped cross-sectional structure.

In some embodiments, the size of the transverse frame 81 is equal to the width of the opener frame 80-2, and an opener movement positioner 90-3 of the opener positioner 90 is located on the transverse frame 81. The size of the rear receptacle 82 is less than half the width of the opener frame 80-2, and an opener rear positioner 90-2 of the opener positioner 90 is located on the rear receptacle 82. The size of the front receptacle 83 is less than half the width of the opener frame 80-2, and an opener front positioner 90-1 of the opener positioner 90 is located on the front receptacle 83.

In addition, the opener frame 80-2 has an opener guide sidewall 89 extending from the front receptacle 83 toward the transverse frame 81 to guide forward/backward movement of the cover opener 70.

In particular, the opener guide sidewall 89 is angled at an acute angle, thereby forming an opener rotation angle K. Thus, when the charging flap cover 20 (i.e., the cover body 21) rotates, the opener guide sidewall 89 imparts rotating movement to the cover opener 70 so that the hook 73 of the cover opener 70 may easily escape from the recess structure of the holder 26 of the charging flap cover 20.

Thus, the front receptacle 83 forms a case alternate angle Ka at an acute angle with respect to the rear receptacle 82 arranged parallel to the transverse frame 81. The case alternate angle Ka allows the front receptacle 83 to be in close contact with the front portion of the cover opener 70 inclined at the opener rotation angle K when the cover opener 70 is moved backward toward the transverse frame 81 along the opener guide sidewall 89.

In this regard, the opener rotation angle K and the case alternate angle Ka are set to the same angle.

In another embodiment, the opener positioner 90 includes the opener front positioner 90-1 provided on the front receptacle 83 of the opener frame 80-2, the opener rear positioner 90-2 provided on the rear receptacle 82 of the opener frame 80-2, the opener movement positioner 90-3 provided on the transverse frame 81 of the opener frame 80-2, and a door cover switch 99 provided on a side portion of the opener frame 80-2 located on a side of the rear receptacle 82 to face the front receptacle 83.

In particular, the opener front positioner 90-1, the opener rear positioner 90-2, and the opener movement positioner 90-3 receive power through electromagnet wires 90A connected to a first electromagnet 91 and a second electromagnet 92. The electromagnet wires 90A are wire pairs each including a positive (+) wire and a negative (−) wire. The controller 100 controls current flowing through the electromagnet wires 90A, thereby enabling the first electromagnet 91 to generate repulsion and the second electromagnet 92 to generate attraction.

For example, the opener front positioner 90-1 includes the second electromagnet 92 generating attraction by receiving current through the electromagnet wires 90A, a front clasp 95-1 configured to maintain a backward movement state of the cover opener 70 due to contact with the front portion of the cover opener 70, and an elastic member 97 configured to be compressed by the front clasp 95-1 drawn by electromagnetic force generated by the second electromagnet 92 and, when the electromagnetic force is removed, push the front clasp 95-1 by elastic restoring force. In this case, the elastic member 97 is implemented as a coil spring.

Thus, in the opener front positioner 90-1, the second electromagnet 92 and the elastic member 97 are fixed to the inner wall of the C-shaped cross-sectional structure of the front receptacle 83, and the front clasp 95-1 is linearly and reciprocally movable to move forward and backward along the C-shaped cross-sectional structure while remaining fixed to the elastic member 97. In this case, the forward linear movement of the front clasp 95-1 is a movement toward the rear receptacle 82.

For example, the opener rear positioner 90-2 includes the second electromagnet 92 generating attraction by receiving current through the electromagnet wires 90A, a rear clasp 95-2 configured to maintain a forward movement state of the cover opener 70 due to contact with the rear portion of the cover opener 70, and the elastic member 97 configured to be compressed by the rear clasp 95-2 by electromagnetic force generated by the second electromagnet 92 and, when the electromagnetic force is removed, push the rear clasp 95-2 by elastic restoring force. In this case, the elastic member 97 is implemented as a coil spring.

In one embodiment, in the opener rear positioner 90-2, the second electromagnet 92 and the elastic member 97 are fixed to the inner wall of the C-shaped cross-sectional structure of the rear receptacle 82, and the rear clasp 95-2 is linearly and reciprocally movable to move forward and backward along the C-shaped cross-sectional structure while remaining fixed to the elastic member 97. In this case, the forward linear movement of the rear clasp 95-2 is a movement toward the front receptacle 83.

In another embodiment, each of the front clasp 95-1 and the rear clasp 95-2 is implemented as a wedge-shaped rod structure having an inclined surface 95b formed on the front end portion. A steel plate 95a (or a steel surface) is provided on the rear end portion of each of the front clasp 95-1 and the rear clasp 95-2 to increase magnetic responsiveness with electromagnetic force of the second electromagnet 92.

For example, the opener movement positioner 90-3 includes the first electromagnet 91 generating repulsion by receiving current through the electromagnet wires 90A and the second electromagnet 92 generating attraction by receiving current through the electromagnet wires 90A. In this case, since the repulsion of the first electromagnet 91 and the attraction of the second electromagnet 92 face the permanent magnet 75 (see FIG. 4) of the cover opener 70, magnetic responsiveness is increased.

In one embodiment, in the opener movement positioner 90-3, the first and second electromagnets 91 and 92 are arranged linearly in the transverse direction on a flat sidewall of the transverse frame 81. In this case, the first electromagnet 91 and the second electromagnet 92 form a vertically-stacked structure.

In another embodiment, on a side portion of the opener frame 80-2, the door cover switch 99 includes a contact terminal 99a and a circuit board 99b (see FIG. 4).

For example, when the contact terminal 99a is moved forward after a short circuit of the contact in response to the backward movement of the cover opener 70, the contact terminal 99a is pressed by the front portion of the cover opener 70. The circuit board 99b is implemented as a PCB to generate a contact point connection signal and a contact point short-circuit signal of the contact terminal 99a. In this case, at a side portion of the opener frame 80-2, the contact terminal 99a faces the front receptacle 83, and is located at the same height as or slightly above the front clasp 95-1 of the opener front positioner 90-1.

In addition, the door cover switch 99 is configured to connect signal lines to the circuit board 99b, and the signal lines are configured to transmit the contact point connection signal and the contact point short-circuit signal of the contact terminal 99a to the controller 100 as contact on/off signals (see FIG. 4).

Figure 7:
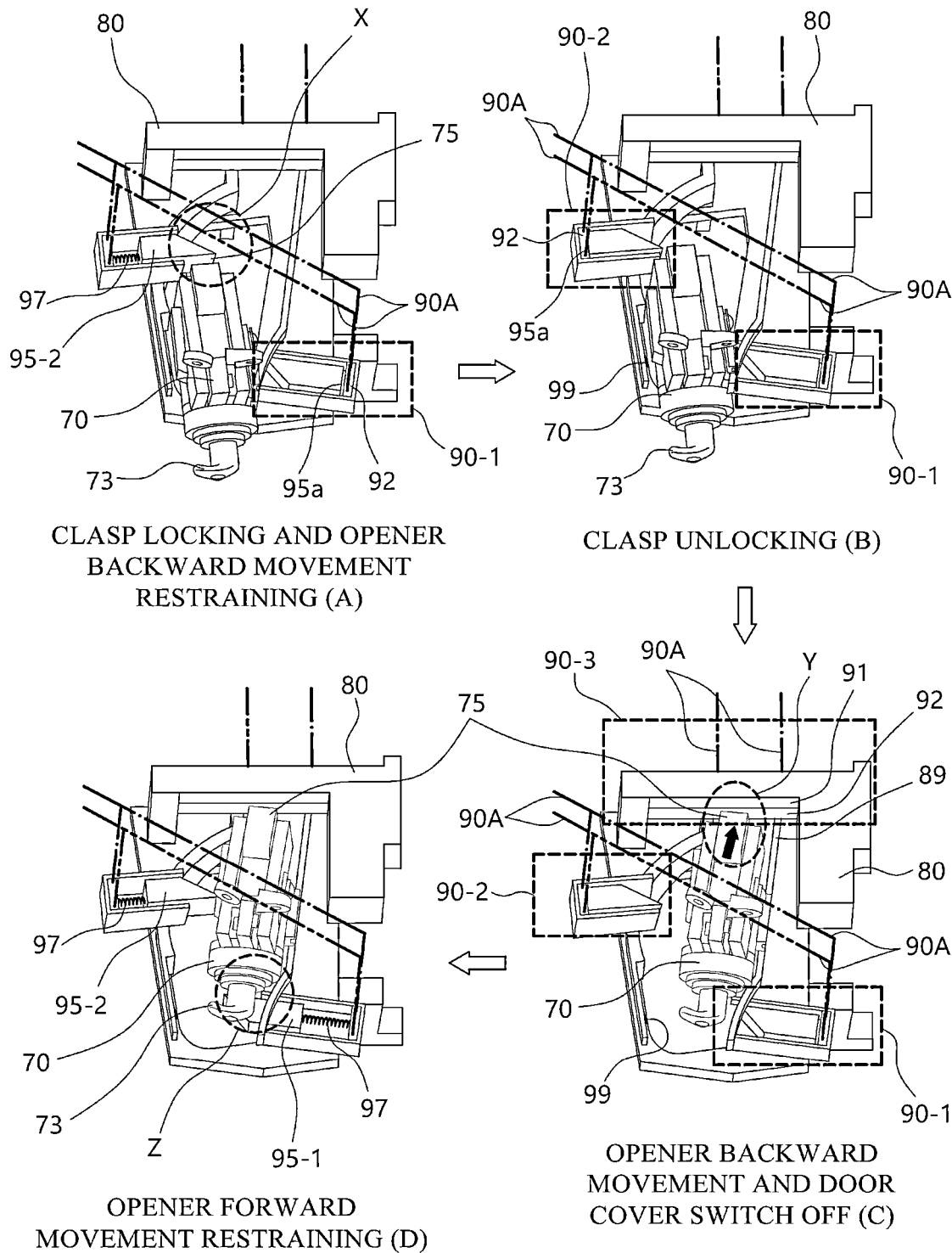
FIG. 7 is a view illustrating a state in which the cover opener is moved from front to back by electromagnetic force generated by the electromagnet of the charging flap cover operating unit according to one embodiment of the present disclosure.
Figure 8:
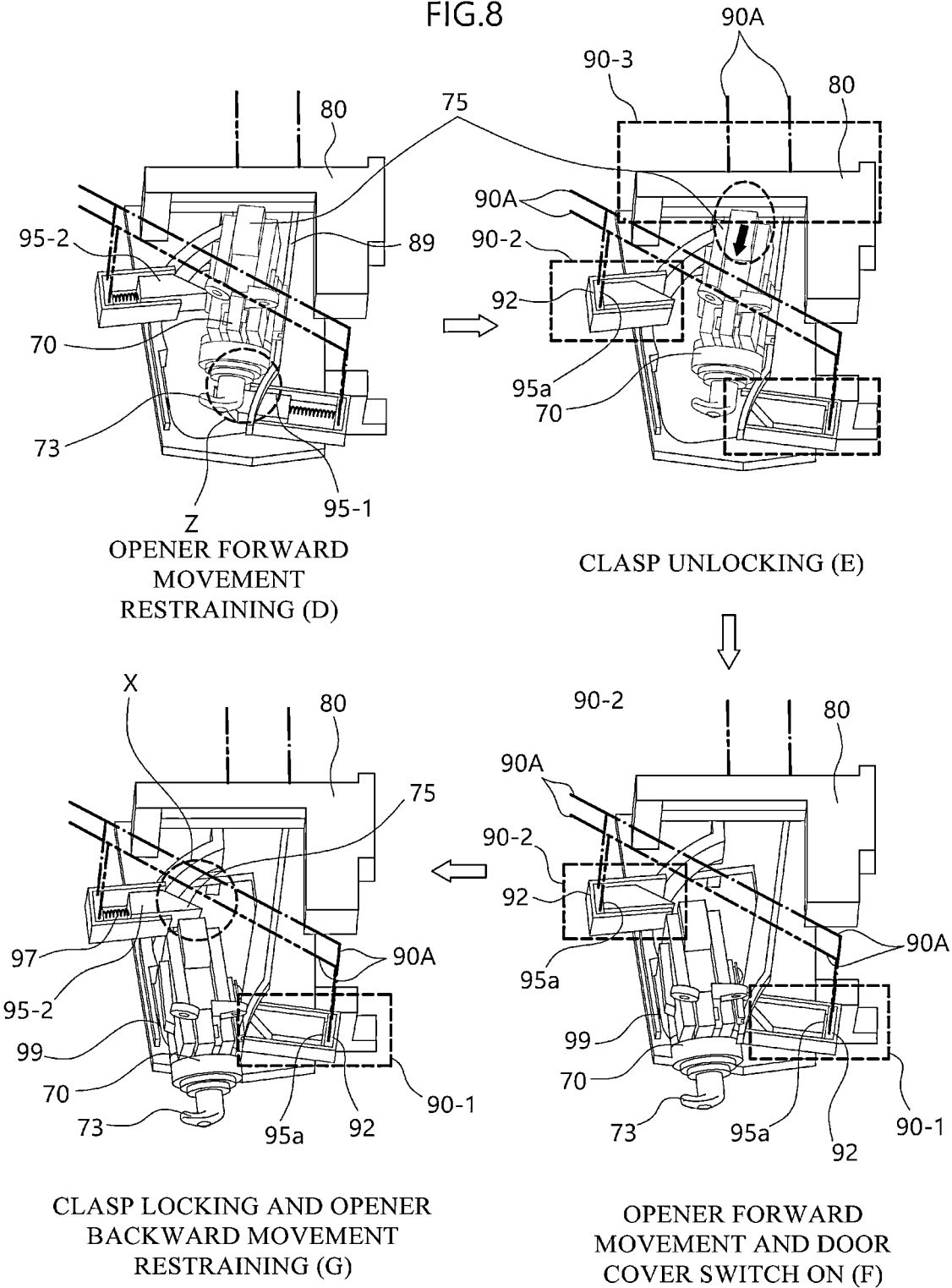
FIG. 8 is a view illustrating a state in which the cover opener is moved from back to front by inversion of electromagnetic force of the electromagnet of the charging flap cover operating unit according to one embodiment of the present disclosure.

In addition, FIGS. 7 and 8 illustrate a backward movement state (see FIG. 7) and a forward movement state (see FIG. 8) of the cover opener 70 through generation of electromagnetic force and conversion between attraction and repulsion by the opener positioner 90. In this case, the actuator 71 of the cover opener 70 is described to be in a state in which the hook 73 is retracted as the supply of current is stopped. The supply of current to the actuator 71 is performed in a charging state in which the charging flap cover 20 is pushed away (see FIG. 9).

In FIG. 7, the backward movement state of the cover opener 70 is described to be: Clasp Locking and Opener Backward Movement Restraining (A)→Clasp Unlocking (B)→Opener Backward Movement and Charging Flap Cover Switch Off (C)→Opener Forward Movement Restraining (D). In this case, the sign "→" indicates a process in which the cover opener 70 moves from a forward position to a backward position.

In addition, in Clasp Locking and Opener Backward Movement Restraining (A) and Clasp Unlocking (B), the cover opener 70 is in a contact state with the door cover switch 99 of the opener positioner 90. In this contact state, the contact plate 99a is connected at the contact point, and thus, the circuit board 99b transmits a contact on signal to the controller 100.

In contrast, in Opener Backward Movement and Charging Flap Cover Switch Off (C) and Opener Forward Movement Restraining (D), the cover opener 70 is in non-contact with the door cover switch 99 of the opener positioner 90. In this non-contact state, the contact plate 99a is short-circuited at the contact point, and thus, the circuit board 99b transmits a contact off signal to the controller 100.

First, in Clasp Locking and Opener Backward Movement Restraining (A), the second electromagnet 92 of the opener front positioner 90-1 of the opener positioner 90 forms attraction to draw the front clasp 95-1 due to current being supplied thereto through the electromagnet wires 90A, whereas the supply of current to the second electromagnet 92 of the opener rear positioner 90-2 and the first electromagnet 91 or the second electromagnet 92 of the opener movement positioner 90-3 remains stopped. In this case, the elastic member 97 of the opener front positioner 90-1 is in a compression deformed state.

Thus, after the cover opener 70 is moved forward, the cover opener 70 remains in a state in which the front portion thereof is in non-contact with the front clasp 95-1 of the opener front positioner 90-1, while the rear portion thereof remains in contact with the rear clasp 95-2 of the opener rear positioner 90-2, i.e., a rear position restrained state (X).

Afterwards, in Clasp Unlocking (B), in a state in which the second electromagnet 92 of the opener front positioner 90-1 of the opener positioner 90 is maintaining the supply of current, the second electromagnet 92 of the opener rear positioner 90-2 forms attraction of drawing the rear clasp 95-2 using current supplied through the electromagnet wires 90A, whereas the supply of current to the first electromagnet 91 or the second electromagnet 92 of the opener movement positioner 90-3 remains stopped. In this case, the elastic members 97 of the opener front positioner 90-1 and the opener rear positioner 90-2 are in a compression deformed state.

Thus, in a state in which the cover opener 70 has moved forward, the front portion of the cover opener 70 is in a non-contact state with the front clasp 95-1 of the opener front positioner 90-1 while the rear portion of the cover opener 70 is in a non-contact state with the rear clasp 95-2 of the opener rear positioner 90-2. In this case, the hook 73 of the cover opener 70 is coupled to the holder 26 of the door cover 20 (see Charging Flap Cover Conceal (A) in FIG. 9), and thus, the forward movement state is maintained.

Subsequently, in Opener Backward Movement and Charging Flap Cover Switch Off (C), in a state in which the supply of current to the second electromagnets 92 of the opener front positioner 90-1 and the opener rear positioner 90-2 of the opener positioner 90 is being maintained, the second electromagnet 92 of the opener movement positioner 90-3 generates attraction using current applied through the electromagnet wires 90A.

Then, the cover opener 70 receives strong attraction of the opener movement positioner 90-3 through interaction with the permanent magnet 75 provided on the rear portion so as to be rotated toward the opener guide sidewall 89 at the opener rotation angle K. Due to this rotation of the cover opener 70, the hook 73 is maintained connected to the holder 26 of the door cover 20 (see Charging Flap Cover Conceal (A) in FIG. 9).

Thus, the cover opener 70 is converted into a free state in which the cover opener 70 is movable from the forward position to the backward position.

Consequently, the cover opener 70 is drawn by the attraction of the opener movement positioner 90-3 so as to be moved from front to back along with the opener guide sidewall 89. Finally, this backward movement further draws the cover opener 70, thereby allowing the air breather 7 to be converted into an outlet open state (see Charging Flap Cover Drawing (C) in FIG. 9). In this case, the rear portion of the cover opener 70 is moved toward the opener movement positioner 90-3, thereby forming a maximum backward movement state (Y) in which the cover opener 70 is completely moved to the transverse frame 81 of the opener movement positioner 90-3.

Finally, in Opener Forward Movement Restraining (D), the second electromagnet 92 of the opener movement positioner 90-3 of the opener positioner 90 forms attraction using current supplied through the electromagnet wires 90A, whereas the supply of current to the second electromagnets 92 of the opener front positioner 90-1 and the opener rear positioner 90-2 remains stopped.

Thus, the front clasp 95-1 of the opener front positioner 90-1 and the rear clasp 95-2 of the opener rear positioner 90-2 have moved forward to the front portion and the rear portion of the cover opener 70, respectively, due to elastic restoring force of the elastic member 97. In this forwardly moved state, the front portion of the cover opener 70 is in contact with the front clasp 95-1 of the opener front positioner 90-1, thereby forming a front position restraint state (Z).

In contrast, in FIG. 8, the forward movement state of the cover opener 70 is described to be: Opener Forward Movement Restraining (D)→Clasp Unlocking (E)→Opener Forward Movement and Charging Flap Cover Switch On (F)→Clasp Locking and Opener Backward Movement Restraining (G). In this case, the sign "→" indicates a process in which the cover opener 70 moves from the forward position to the backward position.

In addition, in Opener Forward Movement and Charging Flap Cover Switch On (F) and Clasp Locking and Opener Backward Movement Restraining (G), the cover opener 70 is in contact with the door cover switch 99 of the opener positioner 90. In this contact state, the contact plate 99*a* is connected at the contact point, and thus, the circuit board 99*b* transmits a contact on signal to the controller 100.

In contrast, in Opener Forward Movement Restraining (D) and Clasp Unlocking (E), the cover opener 70 is in non-contact with the door cover switch 99 of the opener positioner 90. In this non-contact state, the contact plate 99*a* is short-circuited at the contact point, and thus, the circuit board 99*b* transmits a contact off signal to the controller 100.

First, Clasp Unlocking (E) is performed in the same state as Opener Forward Movement Restraining (D) illustrated in FIG. 7. Thus, in Clasp Unlocking (E), the supply of current to the opener front positioner 90-1 of the opener positioner 90 and the second electromagnet 92 of the opener rear positioner 90-2 is maintained. In contrast, the supply of current to the second electromagnet 92 of the opener movement positioner 90-3 is stopped, and the first electromagnet 91 generates repulsion using current supplied through the electromagnet wires 90A.

Thus, the cover opener 70 is moved forward from a backward position to a forward position by the repulsion. This forward movement is reliably performed along the opener guide sidewall 89, so that the cover opener 70 is converted into a forward movement state.

Subsequently, in Opener Forward Movement and Charging Flap Cover Switch On (F), the cover opener 70 is converted from the forward movement position into a contact state with the door cover switch 99 of the opener positioner 90. In this contact state with the door cover switch 99, the contact plate 99*a* is connected at the contact point, and thus, the circuit board 99*b* transmits a contact on signal to the controller 100.

Subsequent Clasp Locking and Opener Backward Movement Restraining (G) is the same as Clasp Locking and Opener Backward Movement Restraining (A) illustrated in FIG. 7, and thus, a description thereof is omitted.

In addition, FIGS. 9 to 12 illustrate a change in the state of the air breather 7 and the fender side portion caused by the seamless charging flap opening/closing device 1-1 in the driving, stopped, and charging states of the vehicle 1. In this case, the operation of the seamless charging flap opening/closing device 1-1 is described to be the charging state and the driving state with respect to the stopped state. However, this sequence of operations is only provided for the clarity of description, and the operations may be performed in any sequence.

Figure 9:
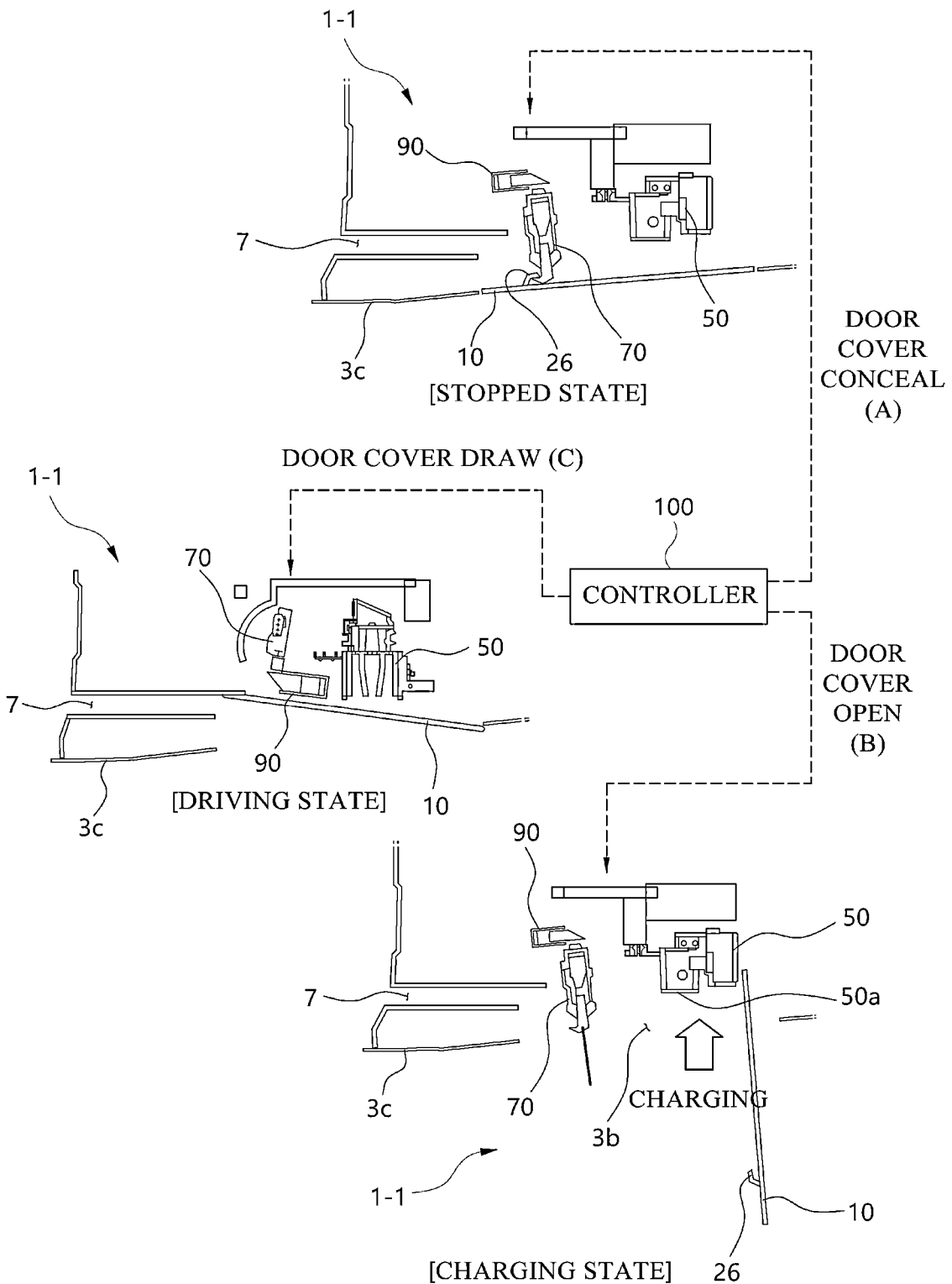
FIG. 9 are views illustrating the states in which the air breather and the fender side portion are changed by the seamless charging flap opening/closing device during the driving, stopped, and charging states of the vehicle according to one embodiment of the present disclosure.
Figure 10:
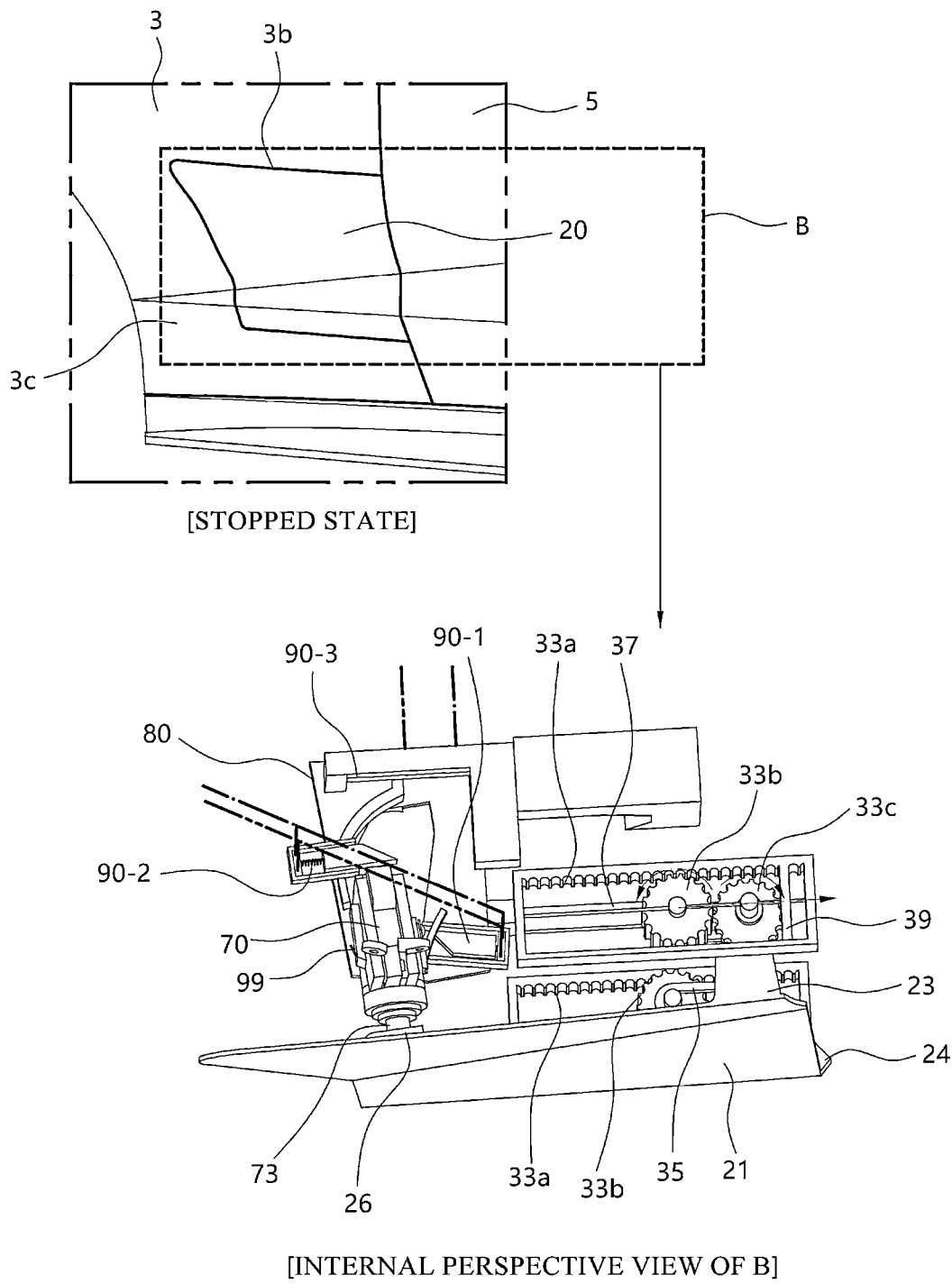
FIG. 10 illustrates an operation state of the seamless charging flap opening/closing device according to one embodiment of the present disclosure in the stopped state of the vehicle.

Referring to the stopped state illustrated in FIGS. 9 and 10, the controller 100 respectively changes the state of operation of each of the opener front positioner 90-1, the opener rear positioner 90-2, and the opener movement positioner 90-3 of the opener positioner 90 using the charging flap cover conceal signal (A) as illustrated in FIGS. 7 and 8. In this case, as described in Clasp Locking and Opener Backward Movement Restraining (A, G) illustrated in FIGS. 7 and 8, the cover opener 70 has been moved forward in the rear position restrained state (X) by the rear clasp 95-2 of the opener rear positioner 90-2 as described above, and the charging flap cover 20 has been fastened to the hook 73 of the cover opener 70 through the holder 26.

Then, the charging flap cover 20 (i.e., the cover body 21) of the hidden charging flap 10 is pushed by the hook 73 of the cover opener 70 to form the fender side end portion aligned with the end section of the fender side cover 3*c*, thereby preventing the air breather 7 and the charging unit 50 from being exposed to the outside.

Specifically, in the stopped state, the top end cover motion guide 30 and the bottom end cover motion guide 40 are operated as follows.

For example, the charging flap cover 20 is pushed as the top and bottom ends 23 and 24 connected to the gear shafts 33*ca* and 43*ca* of the forward gears 33*c* and 43*c* are rotated at a predetermined angle about the rotation line O-O (see FIG. 2) through the cover opener 70 moving from back to front.

Then, the gears 33 and 43 form the rotation line O-O (see FIG. 2) along the gear shafts 33*ca* and 43*ca* of the forward gears 33*c* and 43*c* fixed to the top and bottom ends 23 and 24 of the charging flap cover 20 (i.e., the cover body 21), and the gear shafts 33*ca* and 43*ca* allow the charging flap cover 20 to rotate.

Afterwards, the forward gears 33*c* and 43*c* is rotated while engaged with the linear gears 33*a* and 43*a*, the reverse gears 33*b* and 43*b* bound together with the forward gears 33*c* and 43*c* by the clamps 35 and 45 are rotated in the opposite direction to the forward gears 33*c* and 43*c* while engaged with the linear gears 33*a* and 43*a*, and the gear shafts 33*ba*, 43*ba*, 33*ca*, and 43*ca* of the forward and reverse gears 33*c*, 43*c*, 33*b*, and 43*b* are linearly moved along the guide rods 37 and 47. In response to the linear movement of the gear shafts 33*ba*, 43*ba*, 33*ca*, and 43*ca*, the charging flap cover 20 is pushed.

Afterwards, the gear shaft 33*ca* of the forward gear 33*c* among the gear shafts 33*ba*, 43*ba*, 33*ca*, and 43*ca* presses the contact terminal 39*a* of the power switch 39. The pressing of the contact terminal 39*a* is transmitted to the controller 100 through the circuit board 39*b* as a contact on signal (see FIG. 2).

Finally, the controller 100 perceives that the movement of the forward and reverse gears 33*c*, 43*c*, 33*b*, and 43*b* has been completed on the basis of the contact on signal of the power switch 39, and forms the state of Clasp Locking and Opener Backward Movement Restraining (A) and (G) illustrated in FIGS. 7 and 8 by controlling the supply of power to the opener front positioner 90-1, the opener rear positioner 90-2, and the opener movement positioner 90-3.

Figure 11:
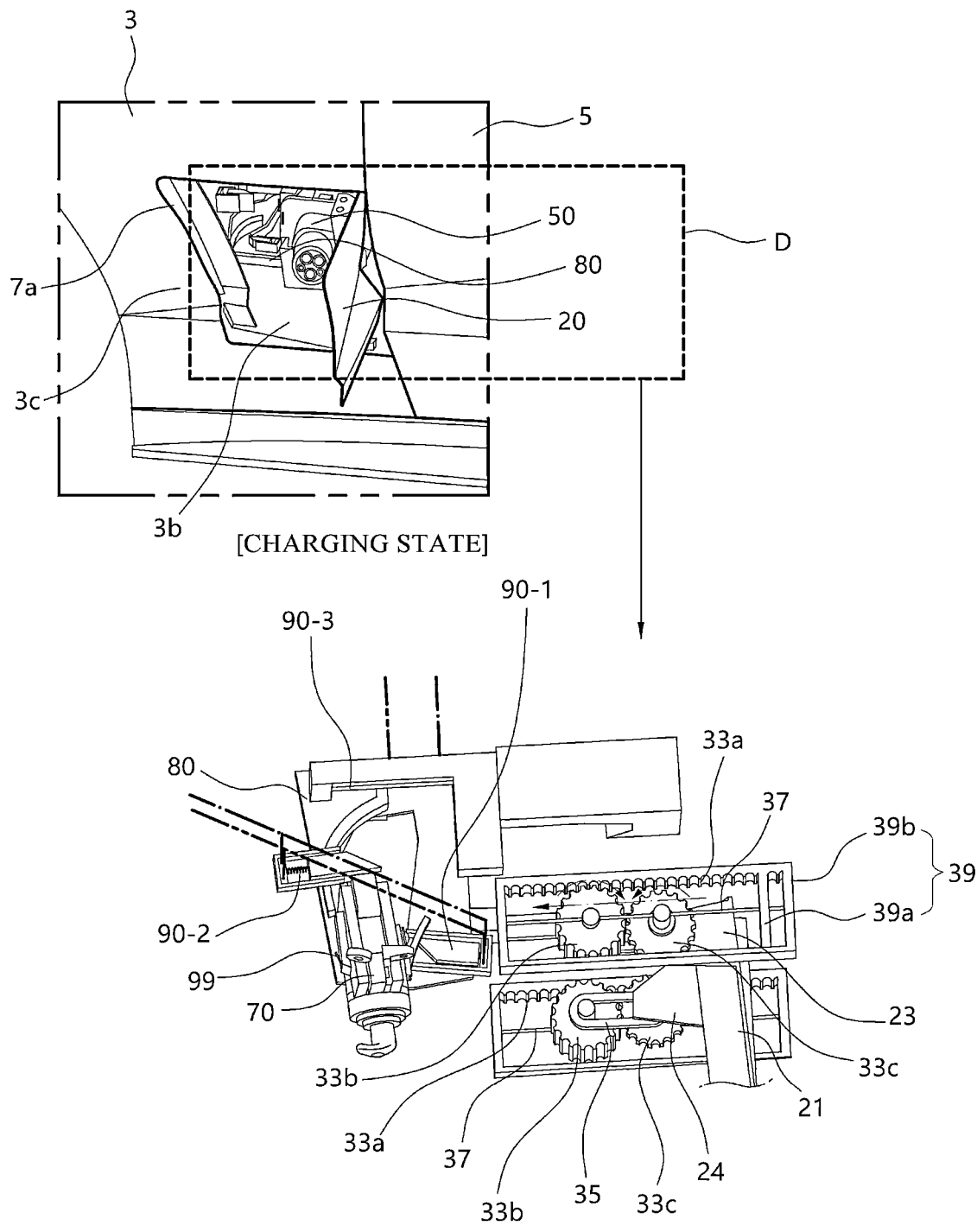
FIG. 11 illustrates an operation state of the seamless charging flap opening/closing device according to one embodiment of the present disclosure in the charging state of the vehicle.

Referring to the charging state illustrated in FIGS. 9 and 11, the controller 100 operates the actuator 71 of the cover opener 70 by the charging flap cover open signal B (or an operation of pressing the charging flap cover 20), thereby allowing the hook 73 to be protruded from the actuator 71. In this case, the cover opener 70 is assumed to be in the same state as the stopped state illustrated in FIGS. 9 and 10

Then, the charging flap cover 20 (i.e., the cover body 21) of the hidden charging flap 10 is pushed away outward by the hook 73 protruded from the actuator 71 of the cover opener 70. Consequently, the charging unit 50 is exposed to the outside, thereby allowing the vehicle battery 9 to be charged.

In one embodiment, in the charging state, the top end cover motion guide 30 and the bottom end cover motion guide 40 are operated as follows.

For example, in a state in which the charging flap cover 20 is released from the hook 73 of the cover opener 70, as the top and bottom ends 23 and 24 connected to the gear shafts 33*ca* and 43*ca* of the forward gears 33*c* and 43*c* of the gears 33 and 43 are pulled to be bent while being rotated at a predetermined angle about the rotation line O-O (see FIG. 2), the charging flap cover 20 is converted into a pop-up state.

Subsequently, the forward gears 33*c* and 43*c* are rotated while engaged with the linear gears 33*a* and 43*a* in response to the charging flap cover 20 being popped up, the reverse gears 33*b* and 43*b* bound together with the forward gears 33*c* and 43*c* by the clamps 35 and 45 are rotated in the opposite direction to the forward gears 33*c* and 43*c* while engaged with the linear gears 33*a* and 43*a*, and the gear shafts 33*ba*, 43*ba*, 33*ca*, and 43*ca* of the forward and reverse gears 33*c*, 43*c*, 33*b*, and 43*b* are linearly moved along the guide rods 37 and 47. Consequently, the forward and reverse gears 33*c*, 43*c*, 33*b*, and 43*b* are also moved forward (i.e., in the direction of the outlet of the air breather 7) following the linear gears 33*a* and 43*a*.

Then, the gear shaft 33*ca* of the forward gear 33*c* among the gear shafts 33*ba*, 43*ba*, 33*ca*, and 43*ca* is detached from the contact terminal 39*a* of the power switch 39, and releasing the contact terminal 39*a* from the pressed state is transmitted to the controller 100 through the circuit board 39*b* as a contact off signal (see FIG. 2).

Afterwards, the controller 100 perceives that the movement of the hidden charging flap 10 has been completed on the basis of the contact on signal of the power switch 39, and forms the state of Clasp Locking and Opener Backward Movement Restraining (A) and (G) illustrated in FIGS. 7 and 8 by controlling the supply of power to the opener front positioner 90-1, the opener rear positioner 90-2, and the opener movement positioner 90-3.

Finally, when the charging flap cover 20 is pressed and closed from the outside, the holder 26 of the charging flap cover 20 is fastened to the hook 73 of the cover opener 70, thereby being converted into a fixed state. Subsequently, in a state in which the charging flap cover 20 and the cover opener 70 are fixed, when the transmission of the charging flap cover open signal b by the controller 100 is stopped or the door cover 20 is pressed from the outside, the charging flap cover 20 and the cover opener 70 are converted to the stopped state illustrated in FIGS. 9 and 10.

Referring to the driving state illustrated in FIGS. 9 and 12, the controller 100 operates the actuator 71 of the cover opener 70 by the charging flap cover draw signal (C) so that the hook 73 is retracted into the actuator 71. In this case, the cover opener 70 is assumed to be in the same state as the stopped state illustrated in FIGS. 9 and 10.

Then, the charging flap cover 20 (i.e., the cover body 21) of the hidden charging flap 10 is drawn by the hook 73 of the cover opener 70. In this state, the charging flap cover 20 is inclined toward the outlet of the air breather 7, so that driving wind entering from the wheel guard 4 exits the fender side cover 3*c* and flows toward the vehicle door 5.

In another embodiment, in the above-described driving state, the top end cover motion guide 30 and the bottom end cover motion guide 40 are operated as follows.

For example, in a state in which the charging flap cover 20 is connected to the hook 73 of the cover opener 70, the charging flap cover 20 is rotated at a predetermined angle by a displacement by which the top and bottom ends 23 and 24 connected to the gear shafts 33*ca* and 43*ca* of the forward gears 33*c* and 43*c* of the gears 33 and 43 are drawn through the rotation line O-O (see FIG. 2), thereby being converted into an inclined state.

Subsequently, the forward gears 33*c* and 43*c* is rotated while engaged with the linear gears 33*a* and 43*a* in the inclined state of the charging flap cover 20, the reverse gears 33*b* and 43*b* bound together with the forward gears 33*c* and 43*c* by the clamps 35 and 45 are rotated in the opposite direction to the forward gears 33*c* and 43*c* while engaged with the linear gears 33*a* and 43*a*, the gear shafts 33*ba*, 43*ba*, 33*ca*, and 43*ca* of the forward and reverse gears 33*c*, 43*c*, 33*b*, and 43*b* are linearly moved along the guide rods 37 and 47, so that the forward and reverse gears 33*c*, 43*c*, 33*b*, and 43*b* are also moved backward (i.e., in the direction of the vehicle door 5) following the linear gears 33*a* and 43*a*

Afterwards, the gear shaft 33*ca* of the forward gear 33*c* among the gear shafts 33*ba*, 43*ba*, 33*ca*, and 43*ca* presses the contact terminal 39*a* of the power switch 39, and pressing the contact terminal 39*a* is transmitted to the controller 100 through the circuit board 39*b* as a contact on signal (see FIG. 2).

Finally, the controller 100 perceives that the movement (i.e., backward movement) of the forward and reverse gears 33*c*, 43*c*, 33*b*, and 43*b* has been completed on the basis the contact on signal of the power switch 39, and forms the state of Opener Forward Movement Restraining (D) illustrated in FIGS. 7 and 8 by controlling the supply of power to the opener front positioner 90-1, the opener rear positioner 90-2, and the opener movement positioner 90-3.

Figure 13:
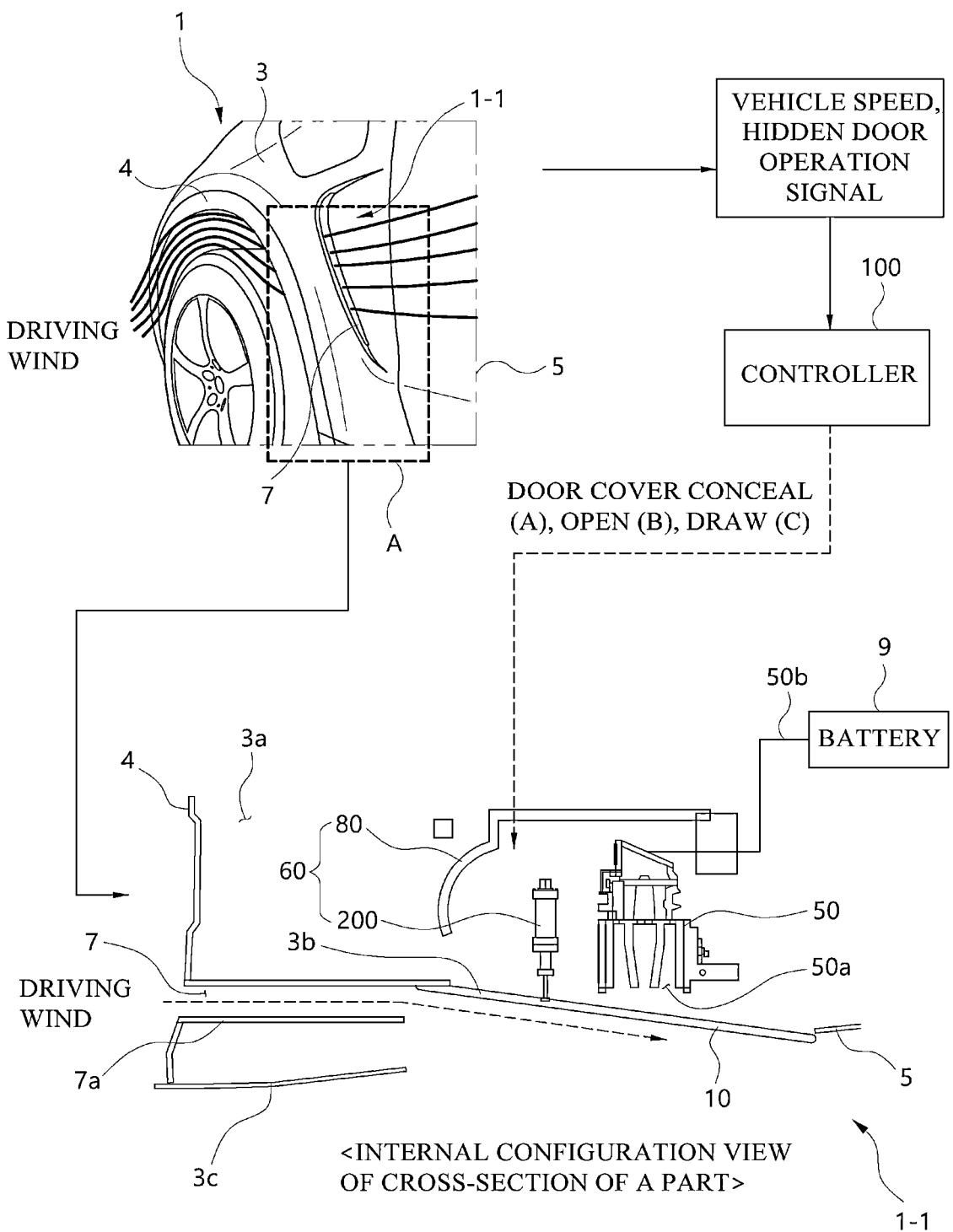
FIG. 13 illustrates an example in which the cover opener is implemented as a hydraulic cylinder according to one embodiment of the present disclosure.

In addition, FIG. 13 illustrates an example of a charging flap opening/closing device 1-1 to which a hydraulic cylinder 200 is applied.

As illustrated in FIG. 13, a seamless charging flap opening/closing device 1-1 includes: the hidden charging flap 10 including the charging flap cover 20, the top end cover motion guide 30, and the bottom end cover motion guide 40; the charging unit 50; the charging flap cover operating unit 60 including the mounting frame 80 and the hydraulic cylinder 200; and the controller 100 receiving a speed signal and a hidden charging flap operation signal as input data and outputting a power supply signal, a power supply stop control signal, a charging flap cover conceal signal (a), a charging flap cover open signal (b), and a charging flap cover draw signal (c).

Thus, the charging flap cover 20, the top and bottom end cover motion guides 30 and 40, the charging unit 50, the mounting frame 80, and the controller 100 have the same configurations and operations as the corresponding components of the charging flap device 1-1 described with reference to FIGS. 1 to 12.

However, the configuration illustrated in FIG. 13 differs from the configuration illustrated in FIGS. 1 to 12 in that the charging flap cover operating unit 60 includes the hydraulic cylinder 200 in place of the electric cover opener 70 including the actuator 71 and the cylinder rod of the hydraulic cylinder 200 realizes forward and backward movements under hydraulic control of the controller 100. In this case, the hydraulic cylinder 200 receives hydraulic pressure through a hydraulic line, and the hydraulic pressure is supplied by a master cylinder of a brake.

Thus, the seamless charging flap opening/closing device 1-1 is characterized as the hydraulic seamless charging flap opening/closing device, unlike the electric seamless charging flap opening/closing device 1-1 illustrated in FIGS. 1 to 12.

As set forth above, in the seamless charging flap opening/closing device 1-1 applied to the vehicle 1 according to embodiments, by the cover opener 70 configured to be moved forward and backward by repulsion of the first electromagnet 91 and attraction of the second electromagnet 92 at the outlet side of the air breather 7 directing driving wind from the wheel guard 4 toward the vehicle door 5 through a side portion of the fender 3, the state of the charging flap cover 20 is changed to one of forward pushing in which the outlet of the air breather 7 is concealed, backward pulling in which the outlet of the air breather 7 is opened, and popping up in which the charging unit 50 to which an external charger is fitted is exposed to the outside. Consequently, in a stopped state, the charging flap cover 20 conceals the air breather and the charging unit 50 so as to be unperceivable from the outside. In particular, the single door cover is used in common by the air breather 7 and the charging unit 50 having separate functions. Thus, the exterior quality of a product and the efficiency of use of a package can be improved, a vehicle body can have a distinctive novel exterior image, and the door cover can be easily matched adjacently to a moving part located adjacent thereto.

What is claimed is:

1. A charging flap opening/closing device comprising:
   a hidden charging flap configured to be opened and closed, with a support portion being provided on one side and a movable portion being provided on an opposite side to the support portion; and
   a charging flap cover operating unit located in an inner space defined by the hidden charging flap and configured to operate the hidden charging flap so that the movable portion is pushed forward, pulled backward, or popped up,
   wherein:
      when pushed forward, the movable portion conceals an outlet of an air breather through which driving wind flows,
      when pulled backward, the movable portion opens the outlet of the air breather, and
      when popped up, the movable portion is bent toward the support portion.

2. The charging flap opening/closing device of claim 1, wherein:
   the air breather is converted into a hidden air breather unperceivable from outside in a vehicle stopped state and serves as an outwardly exposed air breather in a vehicle driving state, and
   the outwardly exposed air breather is converted into the hidden air breather when the vehicle driving state is converted into the vehicle stopped state.

3. The charging flap opening/closing device of claim 1, wherein the air breather serves as an outwardly exposed air breather by providing a channel through which air remaining inside of a wheel house is discharged in a vehicle driving state.

4. The charging flap opening/closing device of claim 1, wherein the hidden charging flap comprises:
   a charging flap cover including a cover body configured to form the support portion and the movable portion, wherein a top end is formed in a top portion of the support portion and a bottom end is formed in a bottom portion of the support portion;
   a top end cover motion guide connected to the top end, and configured to rotate or linearly move to cause the movable portion to be pushed forward, pulled backward, or popped up; and
   a bottom end cover motion guide connected to the bottom end, and configured to move in concert with movement of the top end cover motion guide.

5. The charging flap opening/closing device of claim 4, wherein the top end and the bottom end are perpendicularly bent with respect to the cover body so as to provide a rotation line from the top end and the bottom end.

6. The charging flap opening/closing device of claim 5, wherein:
   each of the top end cover motion guide and the bottom end cover motion guide comprises a gear configured to provide a rotation and a linear movement.

7. The charging flap opening/closing device of claim 6, wherein the gear of the top end cover motion guide comprises:
   a linear gear provided on a rack housing to be provided on an inner surface of a housing space in which the gear is located;
   a reverse gear engaged with the linear gear, and comprising a gear shaft fixed to left and right sidewalls of the rack housing, with a guide rod extending across the housing space extending through the gear shaft of the reverse gear; and
   a forward gear engaged with the linear gear and the reverse gear, and comprising a gear shaft fixed to the top end, with the guide rod extending through the gear shaft of the forward gear.

8. The charging flap opening/closing device of claim 6, wherein the gear of the bottom end cover motion guide comprises:
   a linear gear provided on a rack housing to be provided on an inner surface of a housing space in which the gear is located;
   a reverse gear engaged with the linear gear, and comprising a gear shaft fixed to left and right sidewalls of the rack housing, with a guide rod extending across the housing space extending through the gear shaft of the reverse gear; and
   a forward gear engaged with the linear gear and the reverse gear, and comprising a gear shaft fixed to the bottom end, with the guide rod extending through the gear shaft of the forward gear.

9. The charging flap opening/closing device of claim 1, wherein the charging flap cover operating unit comprises:
   a cover opener connected and separated from a charging flap cover of the hidden charging flap, and configured to move forward and backward to realize a forward-pushing motion, a backward-pulling motion, and a popping-up motion of the movable portion;
   an opener positioner configured to generate an electromagnetic force by separately controlling a current to a first electromagnet and a second electromagnet and to fix a moved position of the cover opener while moving the cover opener forward and backward using the electromagnetic force; and
   a mounting frame on which a charging unit, the cover opener and the opener positioner are mounted.

10. The charging flap opening/closing device of claim 9, wherein:
    the cover opener is driven by an actuator,
    a hook configured to be fastened to a holder of the charging flap cover is provided on a front portion of the actuator, and
    a permanent magnet facing the first electromagnet and the second electromagnet is provided on a rear portion of the actuator.

11. The charging flap opening/closing device of claim 9, wherein the opener positioner comprises:
    an electromagnet wire through which a current flows;
    an opener movement positioner comprising the first electromagnet and the second electromagnet, and configured to generate repulsion using the first electromagnet to enable a forward movement and generate attraction using the second electromagnet to enable a backward movement;

an opener front positioner comprising the second electromagnet, and configured to draw a front clasp by the attraction of the second electromagnet so as to release a front portion of the cover opener from a restrained state; and an opener rear positioner comprising the second electromagnet, and configured to draw a rear clasp by the attraction of the second electromagnet so as to release a rear portion of the cover opener from a restrained state.

12. The charging flap opening/closing device of claim 11, wherein each of the front clasp and the rear clasp is elastically supported by an elastic member.

13. The charging flap opening/closing device of claim 11, wherein:

the opener positioner comprises a charging flap cover switch, the charging flap cover switch being provided on the mounting frame, and being configured to convert a contact off signal into a contact on signal by a contact with the cover opener in a position in front of the cover opener.

14. The charging flap opening/closing device of claim 9, wherein the mounting frame is divided into a port frame on which the charging unit is located, an opener frame on which the cover opener is located at a side of the port frame, and a transverse frame on which the opener positioner being is located behind the opener frame.

15. The charging flap opening/closing device of claim 14, wherein:

the opener frame comprises a rear receptacle and a front receptacle, and an opener rear positioner is located in the rear receptacle, and an opener front positioner is located in the front receptacle.

16. The charging flap opening/closing device of claim 14, wherein:

the opener frame comprises an opener guide sidewall provided at a boundary between the opener frame and the port frame and connected to the transverse frame, and the opener guide sidewall defines an opener rotation angle at which a hook of the cover opener is detached from a holder of the charging flap cover.

17. The charging flap opening/closing device of claim 1, further comprising:

a charging unit located in the inner space of the hidden charging flap and configured to be exposed to outside by opening/closing of the hidden charging flap.

18. A vehicle comprising:

an air breather provided on a fender side cover of a fender, and configured to direct driving wind from a wheel guide toward a vehicle door;

a charging flap opening/closing device configured to activate a backward-pulling motion by which an outlet of the air breather is opened and a popping-up motion by which a charging unit to which an external charger is fitted is exposed to outside; and a controller configured to control signals so that the charging flap opening/closing device works in concert with a driving state of the vehicle.

19. The vehicle of claim 18, wherein charging flap opening/closing device comprises a cover opener connected to a charging flap cover concealing a charging inlet of the fender at an outlet side of the air breather, wherein the charging flap cover activates a forward-pushing by which the outlet of the air breather is concealed by pushing the cover opener by repulsion of a first electromagnet and drawing the cover opener by attraction of a second electromagnet while restraining a front portion of the cover opener by a front clasp and restraining a rear portion of the cover opener by a rear clasp in a forward movement state of the cover opener.

* * * * *